US012719536B2

(12) United States Patent
Chen et al.

(10) Patent No.: US 12,719,536 B2
(45) Date of Patent: Aug. 25, 2026

(54) HOSTED PAYLOAD OPERATIONS WITH SECURED INDEPENDENT COMMUNICATIONS UTILIZING A MULTI-FREQUENCY HOST IN-BAND GROUND ANTENNA

(71) Applicant: The Boeing Company, Chicago, IL (US)

(72) Inventors: Yi-Feng J. Chen, Irvine, CA (US); Robert J. Winig, Rancho Palos Verdes, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/781,953

(22) Filed: Jul. 23, 2024

(65) Prior Publication Data

US 2025/0317169 A1 Oct. 9, 2025

Related U.S. Application Data

(60) Provisional application No. 63/574,202, filed on Apr. 3, 2024.

(51) Int. Cl.

| | |
|---|---|
| ***H04B 7/06*** | (2006.01) |
| ***H04L 5/00*** | (2006.01) |
| ***H04L 9/40*** | (2022.01) |

(52) U.S. Cl.

CPC ......... *H04B 7/0608* (2013.01); *H04L 5/0044* (2013.01); *H04L 63/0428* (2013.01)

(58) Field of Classification Search

CPC .. H04B 7/0608; H04L 5/0044; H04L 63/0428

USPC ........................................................ 380/270

See application file for complete search history.

(56) References Cited

U.S. PATENT DOCUMENTS

| | | | |
|---|---|---|---|
| 10,419,403 | B2 | 9/2019 | Winig et al. |
| 10,516,992 | B2 | 12/2019 | Winig et al. |
| 10,530,751 | B2 | 1/2020 | Winig et al. |
| 10,728,221 | B2 | 7/2020 | Chen et al. |
| 11,101,879 | B2 | 8/2021 | Miller et al. |
| 11,196,717 | B2 | 12/2021 | Winig et al. |
| 11,201,707 | B2 | 12/2021 | Chen et al. |
| 11,290,176 | B2 | 3/2022 | Winig et al. |
| 11,388,150 | B2 | 7/2022 | Winig et al. |
| 11,388,151 | B2 | 7/2022 | Chen et al. |

(Continued)

*Primary Examiner* — Dant B Shaifer Harriman

(74) *Attorney, Agent, or Firm* — Alleman Hall LLP

(57) ABSTRACT

Systems, methods, and apparatus for secured independent hosted payload operations are disclosed. A system may include a hosted payload operations center (HOC) controlling operations of a hosted payload on a vehicle. The HOC transmits encrypted hosted commands to the vehicle via a hosted command (CMD) path. The vehicle further carries a host payload whose operations are controlled by a host payload operations center (HPC). The HPC transmits encrypted host commands to the vehicle via a host CMD path. The host payload generates encrypted host telemetry (TLM), and the hosted payload generates encrypted hosted TLM. The vehicle transmits the host TLM to the HPC via a host TLM path and transmits the hosted TLM to the HOC via a hosted TLM path. Some embodiments use a multi-frequency antenna for host and/or hosted CMD and/or TLM transmissions and/or receptions. Other features are also provided.

20 Claims, 27 Drawing Sheets

(56) References Cited

U.S. PATENT DOCUMENTS

| | | | | |
|---|---|---|---|---|
| 11,394,458 | B2 | 7/2022 | Miller et al. | |
| 11,516,189 | B2 | 11/2022 | Winig et al. | |
| 11,595,360 | B2 | 2/2023 | Chen et al. | |
| 11,671,408 | B2 | 6/2023 | Winig et al. | |
| 11,689,509 | B2 | 6/2023 | Winig et al. | |
| 11,811,490 | B2 | 11/2023 | Miller et al. | |
| 2018/0254822 | A1* | 9/2018 | Miller | H04L 63/0428 |
| 2018/0254823 | A1* | 9/2018 | Miller | H04L 67/75 |
| 2018/0254866 | A1* | 9/2018 | Chen | H04L 5/0046 |
| 2018/0255024 | A1* | 9/2018 | Chen | H04W 12/037 |
| 2018/0255025 | A1* | 9/2018 | Chen | H04W 12/037 |
| 2018/0255026 | A1* | 9/2018 | Winig | H04L 9/14 |
| 2018/0255027 | A1* | 9/2018 | Winig | H04W 12/037 |
| 2018/0255455 | A1* | 9/2018 | Winig | H04B 7/18582 |
| 2019/0356639 | A1* | 11/2019 | Winig | H04B 7/18519 |
| 2020/0068392 | A1* | 2/2020 | Winig | H04B 7/18593 |
| 2020/0244631 | A1* | 7/2020 | Chen | H04B 7/18513 |
| 2020/0322319 | A1* | 10/2020 | Chen | H04B 7/18513 |
| 2021/0160228 | A1* | 5/2021 | Scott | G06F 21/6209 |
| 2023/0080153 | A1* | 3/2023 | Winig | H04L 63/0428 713/164 |
| 2023/0081825 | A1* | 3/2023 | Winig | H04B 7/18589 380/255 |
| 2023/0188207 | A1* | 6/2023 | Miller | H04B 7/18515 370/326 |
| 2023/0239278 | A1 | 7/2023 | Winig et al. | |
| 2023/0275878 | A1* | 8/2023 | Winig | H04B 7/18565 713/164 |
| 2025/0317169 | A1* | 10/2025 | Chen | H04B 7/0608 |

* cited by examiner

100

| HOC to Host Payload Ops Center (HPC) to Host Ground Antenna to Host Payload | | | | |
|---|---|---|---|---|
| Scenario No. | Host CMD | Host TLM | Hosted CMD | Hosted TLM |
| 1 | Outband | Outband | via HPC and Host Ground Antenna | via HPC and Host Ground Antenna |
| 2 | Outband | Outband | via HPC and Host Ground Antenna | via Hosted Ground Antenna |
| 3 | Outband | Outband | via Hosted Ground Antenna | via HPC and Host Ground Antenna |
| 4 | Outband | Outband | via Hosted Ground Antenna | via Hosted Ground Antenna |
| 5 | Outband | via Host Ground Antenna | via HPC and Host Ground Antenna | via HPC and Host Ground Antenna |
| 6 | Outband | via Host Ground Antenna | via HPC and Host Ground Antenna | via Hosted Ground Antenna |
| 7 | Outband | via Host Ground Antenna | via Hosted Ground Antenna | via HPC and Host Ground Antenna |
| 8 | Outband | via Host Ground Antenna | via Hosted Ground Antenna | via Hosted Ground Antenna |
| 9 | via Host Ground Antenna | Outband | via HPC and Host Ground Antenna | via HPC and Host Ground Antenna |
| 10 | via Host Ground Antenna | Outband | via HPC and Host Ground Antenna | via Hosted Ground Antenna |
| 11 | via Host Ground Antenna | Outband | via Hosted Ground Antenna | via HPC and Host Ground Antenna |
| 12 | via Host Ground Antenna | Outband | via Hosted Ground Antenna | via Hosted Ground Antenna |
| 13 | via Host Ground Antenna | via Host Ground Antenna | via HPC and Host Ground Antenna | via HPC and Host Ground Antenna |
| 14 | via Host Ground Antenna | via Host Ground Antenna | via HPC and Host Ground Antenna | via Hosted Ground Antenna |
| 15 | via Host Ground Antenna | via Host Ground Antenna | via Hosted Ground Antenna | via HPC and Host Ground Antenna |
| 16 | via Host Ground Antenna | via Host Ground Antenna | via Hosted Ground Antenna | via Hosted Ground Antenna |

FIG. 13A

| HOC direct to Host Ground Antenna to Host Payload | | | | |
|---|---|---|---|---|
| Scenario No. | Host CMD | Host TLM | Hosted CMD | Hosted TLM |
| 17 | Outband | Outband | direct to Host Ground Antenna | direct from Host Ground Antenna |
| 18 | Outband | Outband | direct to Host Ground Antenna | via Hosted Ground Antenna |
| 19 | Outband | Outband | via Hosted Ground Antenna | direct from Host Ground Antenna |
| 20 | Outband | via Host Ground Antenna | direct to Host Ground Antenna | direct from Host Ground Antenna |
| 21 | Outband | via Host Ground Antenna | direct to Host Ground Antenna | via Hosted Ground Antenna |
| 22 | Outband | via Host Ground Antenna | via Hosted Ground Antenna | direct from Host Ground Antenna |
| 23 | via Host Ground Antenna | Outband | direct to Host Ground Antenna | direct from Host Ground Antenna |
| 24 | via Host Ground Antenna | Outband | direct to Host Ground Antenna | via Hosted Ground Antenna |
| 25 | via Host Ground Antenna | Outband | via Hosted Ground Antenna | direct from Host Ground Antenna |
| 26 | via Host Ground Antenna | via Host Ground Antenna | direct to Host Ground Antenna | direct from Host Ground Antenna |
| 27 | via Host Ground Antenna | via Host Ground Antenna | direct to Host Ground Antenna | via Hosted Ground Antenna |
| 28 | via Host Ground Antenna | via Host Ground Antenna | via Hosted Ground Antenna | direct from Host Ground Antenna |

*FIG. 13B*

| HOC to Multi Frequency Host Ground Antenna to Hosted Payload | | | | |
|---|---|---|---|---|
| Scenario No. | Host CMD | Host TLM | Hosted CMD | Hosted TLM |
| 29 | Outband | Outband | via Multi-Freq Host Ground Antenna | via Multi-Freq Host Ground Antenna |
| 30 | Outband | Outband | via Multi-Freq Host Ground Antenna | via Hosted Ground Antenna |
| 31 | Outband | Outband | via Hosted Ground Antenna | via Multi-Freq Host Ground Antenna |
| 32 | Outband | via Host Ground Antenna | via Multi-Freq Host Ground Antenna | via Multi-Freq Host Ground Antenna |
| 33 | Outband | via Host Ground Antenna | via Multi-Freq Host Ground Antenna | via Hosted Ground Antenna |
| 34 | Outband | via Host Ground Antenna | via Hosted Ground Antenna | via Multi-Freq Host Ground Antenna |
| 35 | via Host Ground Antenna | Outband | via Multi-Freq Host Ground Antenna | via Multi-Freq Host Ground Antenna |
| 36 | via Host Ground Antenna | Outband | via Multi-Freq Host Ground Antenna | via Hosted Ground Antenna |
| 37 | via Host Ground Antenna | Outband | via Hosted Ground Antenna | via Multi-Freq Host Ground Antenna |
| 38 | via Host Ground Antenna | via Host Ground Antenna | via Multi-Freq Host Ground Antenna | via Multi-Freq Host Ground Antenna |
| 39 | via Host Ground Antenna | via Host Ground Antenna | via Multi-Freq Host Ground Antenna | via Hosted Ground Antenna |
| 40 | via Host Ground Antenna | via Host Ground Antenna | via Hosted Ground Antenna | via Multi-Freq Host Ground Antenna |

*FIG. 13C*

| HOC direct to Out of Band Host Gateway Antenna | | | | |
|---|---|---|---|---|
| Scenario No. | Host CMD | Host TLM | Hosted CMD | Hosted TLM |
| 41 | Outband | Outband | direct to Outband | direct to Outband |
| 42 | Outband | Outband | direct to Outband | via Hosted Ground Antenna |
| 43 | Outband | Outband | via Hosted Ground Antenna | direct to Outband |
| 44 | Outband | via Host Ground Antenna | direct to Outband | direct to Outband |
| 45 | Outband | via Host Ground Antenna | direct to Outband | via Hosted Ground Antenna |
| 46 | Outband | via Host Ground Antenna | via Hosted Ground Antenna | direct to Outband |
| 47 | via Host Ground Antenna | Outband | direct to Outband | direct to Outband |
| 48 | via Host Ground Antenna | Outband | direct to Outband | via Hosted Ground Antenna |
| 49 | via Host Ground Antenna | Outband | via Hosted Ground Antenna | direct to Outband |
| 50 | via Host Ground Antenna | via Host Ground Antenna | direct to Outband | direct to Outband |
| 51 | via Host Ground Antenna | via Host Ground Antenna | direct to Outband | via Hosted Ground Antenna |
| 52 | via Host Ground Antenna | via Host Ground Antenna | via Hosted Ground Antenna | direct to Outband |

*FIG. 13D*

| HOC to HPC to Host Ground Antenna to Host Payload & HOC direct to Host Ground Antenna to Host Payload | | | | |
|---|---|---|---|---|
| Scenario No. | Host CMD | Host TLM | Hosted CMD | Hosted TLM |
| 53 | Outband | Outband | via HPC and Host Ground Antenna | direct from Host Ground Antenna |
| 54 | Outband | Outband | direct to Host Ground Antenna | via HPC and Host Ground Antenna |
| 55 | Outband | via Host Ground Antenna | via HPC and Host Ground Antenna | direct from Host Ground Antenna |
| 56 | Outband | via Host Ground Antenna | direct to Host Ground Antenna | via HPC and Host Ground Antenna |
| 57 | via Host Ground Antenna | Outband | via HPC and Host Ground Antenna | direct from Host Ground Antenna |
| 58 | via Host Ground Antenna | Outband | direct to Host Ground Antenna | via HPC and Host Ground Antenna |
| 59 | via Host Ground Antenna | via Host Ground Antenna | via HPC and Host Ground Antenna | direct from Host Ground Antenna |
| 60 | via Host Ground Antenna | via Host Ground Antenna | direct to Host Ground Antenna | via HPC and Host Ground Antenna |

*FIG. 13E*

| HOC to HPC to Host Ground Antenna to Host Payload & HOC direct to Mulit-Frequency Host Ground Antenna to Hosted Payload | | | | |
|---|---|---|---|---|
| Scenario No. | Host CMD | Host TLM | Hosted CMD | Hosted TLM |
| 61 | Outband | Outband | via HPC and Host Ground Antenna | via Multi-Freq Host Ground Antenna |
| 62 | Outband | Outband | via Multi-Freq Host Ground Antenna | via HPC and Host Ground Antenna |
| 63 | Outband | via Host Ground Antenna | via HPC and Host Ground Antenna | via Multi-Freq Host Ground Antenna |
| 64 | Outband | via Host Ground Antenna | via Multi-Freq Host Ground Antenna | via HPC and Host Ground Antenna |
| 65 | via Host Ground Antenna | Outband | via HPC and Host Ground Antenna | via Multi-Freq Host Ground Antenna |
| 66 | via Host Ground Antenna | Outband | via Multi-Freq Host Ground Antenna | via HPC and Host Ground Antenna |
| 67 | via Host Ground Antenna | via Host Ground Antenna | via HPC and Host Ground Antenna | via Multi-Freq Host Ground Antenna |
| 68 | via Host Ground Antenna | via Host Ground Antenna | via Multi-Freq Host Ground Antenna | via HPC and Host Ground Antenna |

FIG. 13F

| HOC to HPC to Host Ground Antenna to Host Payload & HOC direct to Out of Band Host Gateway Antenna | | | | |
|---|---|---|---|---|
| Scenario No. | Host CMD | Host TLM | Hosted CMD | Hosted TLM |
| 69 | Outband | Outband | via HPC and Host Ground Antenna | direct to Outband |
| 70 | Outband | Outband | direct to Outband | via HPC and Host Ground Antenna |
| 71 | Outband | via Host Ground Antenna | via HPC and Host Ground Antenna | direct to Outband |
| 72 | Outband | via Host Ground Antenna | direct to Outband | via HPC and Host Ground Antenna |
| 73 | via Host Ground Antenna | Outband | via HPC and Host Ground Antenna | direct to Outband |
| 74 | via Host Ground Antenna | Outband | direct to Outband | via HPC and Host Ground Antenna |
| 75 | via Host Ground Antenna | via Host Ground Antenna | via HPC and Host Ground Antenna | direct to Outband |
| 76 | via Host Ground Antenna | via Host Ground Antenna | direct to Outband | via HPC and Host Ground Antenna |

*FIG. 13G*

| HOC direct to Host Ground Antenna to Host Payload & HOC direct to Multi Frequency Host Ground Antenna to Hosted Payload | | | | |
|---|---|---|---|---|
| Scenario No. | Host CMD | Host TLM | Hosted CMD | Hosted TLM |
| 77 | Outband | Outband | direct to Host Ground Antenna | via Multi-Freq Host Ground Antenna |
| 78 | Outband | Outband | via Multi-Freq Host Ground Antenna | direct from Host Ground Antenna |
| 79 | Outband | via Host Ground Antenna | direct to Host Ground Antenna | via Multi-Freq Host Ground Antenna |
| 80 | Outband | via Host Ground Antenna | via Multi-Freq Host Ground Antenna | direct from Host Ground Antenna |
| 81 | via Host Ground Antenna | Outband | direct to Host Ground Antenna | via Multi-Freq Host Ground Antenna |
| 82 | via Host Ground Antenna | Outband | via Multi-Freq Host Ground Antenna | direct from Host Ground Antenna |
| 83 | via Host Ground Antenna | via Host Ground Antenna | direct to Host Ground Antenna | via Multi-Freq Host Ground Antenna |
| 84 | via Host Ground Antenna | via Host Ground Antenna | via Multi-Freq Host Ground Antenna | direct from Host Ground Antenna |

FIG. 13H

| HOC direct to Host Ground Antenna to Host Payload & HOC direct to Out of Band Host Gateway Antenna | | | | |
|---|---|---|---|---|
| Scenario No. | Host CMD | Host TLM | Hosted CMD | Hosted TLM |
| 85 | Outband | Outband | direct to Host Ground Antenna | direct to Outband |
| 86 | Outband | Outband | direct to Outband | direct from Host Ground Antenna |
| 87 | Outband | via Host Ground Antenna | direct to Host Ground Antenna | direct to Outband |
| 88 | Outband | via Host Ground Antenna | direct to Outband | direct from Host Ground Antenna |
| 89 | via Host Ground Antenna | Outband | direct to Host Ground Antenna | direct to Outband |
| 90 | via Host Ground Antenna | Outband | direct to Outband | direct from Host Ground Antenna |
| 91 | via Host Ground Antenna | via Host Ground Antenna | direct to Host Ground Antenna | direct to Outband |
| 92 | via Host Ground Antenna | via Host Ground Antenna | direct to Outband | direct from Host Ground Antenna |

*FIG. 13I*

| HOC direct to Multi Frequency Host Ground Antenna to Hosted Payload & HOC direct to Out of Band Host Gateway Antenna | | | | |
|---|---|---|---|---|
| Scenario No. | Host CMD | Host TLM | Hosted CMD | Hosted TLM |
| 93 | Outband | Outband | via Multi-Freq Host Ground Antenna | direct to Outband |
| 94 | Outband | Outband | direct to Outband | via Multi-Freq Host Ground Antenna |
| 95 | Outband | via Host Ground Antenna | via Multi-Freq Host Ground Antenna | direct to Outband |
| 96 | Outband | via Host Ground Antenna | direct to Outband | via Multi-Freq Host Ground Antenna |
| 97 | via Host Ground Antenna | Outband | via Multi-Freq Host Ground Antenna | direct to Outband |
| 98 | via Host Ground Antenna | Outband | direct to Outband | via Multi-Freq Host Ground Antenna |
| 99 | via Host Ground Antenna | via Host Ground Antenna | via Multi-Freq Host Ground Antenna | direct to Outband |
| 100 | via Host Ground Antenna | via Host Ground Antenna | direct to Outband | via Multi-Freq Host Ground Antenna |

FIG. 13J

| HOC to HPC to Multi Frequency Host Ground Antenna to Hosted Payload & HOC direct to Out of Band Host Gateway Antenna | | | | |
|---|---|---|---|---|
| Scenario No. | Host CMD | Host TLM | Hosted CMD | Hosted TLM |
| 101 | Outband | Outband | via HPC and Multi-Freq Host Ground Antenna | direct to Outband |
| 102 | Outband | Outband | direct to Outband | via HPC and Multi-Freq Host Ground Antenna |
| 103 | Outband | via Host Ground Antenna | via HPC and Multi-Freq Host Ground Antenna | direct to Outband |
| 104 | Outband | via Host Ground Antenna | direct to Outband | via HPC and Multi-Freq Host Ground Antenna |
| 105 | via Host Ground Antenna | Outband | via HPC and Multi-Freq Host Ground Antenna | direct to Outband |
| 106 | via Host Ground Antenna | Outband | direct to Outband | via HPC and Multi-Freq Host Ground Antenna |
| 107 | via Host Ground Antenna | via Host Ground Antenna | via HPC and Multi-Freq Host Ground Antenna | direct to Outband |
| 108 | via Host Ground Antenna | via Host Ground Antenna | direct to Outband | via HPC and Multi-Freq Host Ground Antenna |

*FIG. 13K*

| HOC to HPC to Multi Frequency Host Ground Antenna to Hosted Payload & HOC to Host Ground Antenna to Hosted Payload | | | | |
|---|---|---|---|---|
| Scenario No. | Host CMD | Host TLM | Hosted CMD | Hosted TLM |
| 109 | Outband | Outband | via HPC and Multi-Freq Host Ground Antenna | via HPC and Multi-Freq Host Ground Antenna |
| 110 | Outband | Outband | via HPC and Multi-Freq Host Ground Antenna | via Hosted Ground Antenna |
| 111 | Outband | Outband | via Hosted Ground Antenna | via HPC and Multi-Freq Host Ground Antenna |
| 112 | Outband | via Host Ground Antenna | via HPC and Multi-Freq Host Ground Antenna | via HPC and Multi-Freq Host Ground Antenna |
| 113 | Outband | via Host Ground Antenna | via HPC and Multi-Freq Host Ground Antenna | via Hosted Ground Antenna |
| 114 | Outband | via Host Ground Antenna | via Hosted Ground Antenna | via HPC and Multi-Freq Host Ground Antenna |
| 115 | via Host Ground Antenna | Outband | via HPC and Multi-Freq Host Ground Antenna | via HPC and Multi-Freq Host Ground Antenna |
| 116 | via Host Ground Antenna | Outband | via HPC and Multi-Freq Host Ground Antenna | via Hosted Ground Antenna |
| 117 | via Host Ground Antenna | Outband | via Hosted Ground Antenna | via HPC and Multi-Freq Host Ground Antenna |
| 118 | via Host Ground Antenna | via Host Ground Antenna | via HPC and Multi-Freq Host Ground Antenna | via HPC and Multi-Freq Host Ground Antenna |
| 119 | via Host Ground Antenna | via Host Ground Antenna | via HPC and Multi-Freq Host Ground Antenna | via Hosted Ground Antenna |
| 120 | via Host Ground Antenna | via Host Ground Antenna | via Hosted Ground Antenna | via HPC and Multi-Freq Host Ground Antenna |

*FIG. 13L*

| HOC to HPC to Multi Frequency Host Ground Antenna to Hosted Payload & HOC direct to Host Ground Antenna to Host Payload | | | | |
|---|---|---|---|---|
| Scenario No. | Host CMD | Host TLM | Hosted CMD | Hosted TLM |
| 121 | Outband | Outband | via HPC and Multi-Freq Host Ground Antenna | direct from Host Ground Antenna |
| 122 | Outband | Outband | direct to Host Ground Antenna | via HPC and Multi-Freq Host Ground Antenna |
| 123 | Outband | via Host Ground Antenna | via HPC and Multi-Freq Host Ground Antenna | direct from Host Ground Antenna |
| 124 | Outband | via Host Ground Antenna | direct to Host Ground Antenna | via HPC and Multi-Freq Host Ground Antenna |
| 125 | via Host Ground Antenna | Outband | via HPC and Multi-Freq Host Ground Antenna | direct from Host Ground Antenna |
| 126 | via Host Ground Antenna | Outband | direct to Host Ground Antenna | via HPC and Multi-Freq Host Ground Antenna |
| 127 | via Host Ground Antenna | via Host Ground Antenna | via HPC and Multi-Freq Host Ground Antenna | direct from Host Ground Antenna |
| 128 | via Host Ground Antenna | via Host Ground Antenna | direct to Host Ground Antenna | via HPC and Multi-Freq Host Ground Antenna |

FIG.13M

| HOC to HPC to Multi Frequency Host Ground Antenna to Hosted Payload & HOC direct to Multi Frequency Host Ground Antenna to Hosted Payload | | | | |
|---|---|---|---|---|
| Scenario No. | Host CMD | Host TLM | Hosted CMD | Hosted TLM |
| 129 | Outband | Outband | via HPC and Multi-Freq Host Ground Antenna | via Multi-Freq Host Ground Antenna |
| 130 | Outband | Outband | via Multi-Freq Host Ground Antenna | via HPC and Multi-Freq Host Ground Antenna |
| 131 | Outband | via Host Ground Antenna | via HPC and Multi-Freq Host Ground Antenna | via Multi-Freq Host Ground Antenna |
| 132 | Outband | via Host Ground Antenna | via Multi-Freq Host Ground Antenna | via HPC and Multi-Freq Host Ground Antenna |
| 133 | via Host Ground Antenna | Outband | via HPC and Multi-Freq Host Ground Antenna | via Multi-Freq Host Ground Antenna |
| 134 | via Host Ground Antenna | Outband | via Multi-Freq Host Ground Antenna | via HPC and Multi-Freq Host Ground Antenna |
| 135 | via Host Ground Antenna | via Host Ground Antenna | via HPC and Multi-Freq Host Ground Antenna | via Multi-Freq Host Ground Antenna |
| 136 | via Host Ground Antenna | via Host Ground Antenna | via Multi-Freq Host Ground Antenna | via HPC and Multi-Freq Host Ground Antenna |

*FIG. 13N*

HOSTED PAYLOAD OPERATIONS WITH SECURED INDEPENDENT COMMUNICATIONS UTILIZING A MULTI-FREQUENCY HOST IN-BAND GROUND ANTENNA

CROSS-REFERENCE TO RELATED APPLICATIONS

The present application claims priority to U.S. Provisional Application No. 63/574,202, titled "SECURED INDEPENDENT HOSTED PAYLOAD OPERATIONS," filed Apr. 3, 2024, incorporated herein by reference in its entirety.

FIELD

The present disclosure relates to hosted payload operations with secured independent communications. Some embodiments use a multi-frequency host in-band ground antenna for both host payloads and hosted payloads carried by a vehicle.

BACKGROUND

Currently, typical payload operations for a vehicle (e.g., a satellite) have the ability to command the payload on the vehicle from a Satellite Operations Center (SOC). There are also some operators that perform payload operations form a separate payload operations center where the payload is controlled. The payload commands are communicated via a command path that can be transmitted to the vehicle via either in-band or out-of-band communications through ground antennas.

As such, there is a need for an improved payload operations design that allows for privacy for the hosted payloads in the allocation of resources on the hosted payload.

SUMMARY

The present disclosure relates to a method, system, and apparatus for hosted payload operations with secured communications. In some embodiments, the secured communications are independent communications utilizing a multi-frequency host in-band ground antenna. In one or more embodiments, a system comprises: a hosted payload operations center (HOC) to control operations of a hosted payload on a vehicle, the HOC being to generate encrypted hosted commands in accordance with hosted user requests and to transmit the hosted commands to the vehicle via a hosted command (CMD) path; wherein the vehicle further carries a host payload whose operations are controlled by a host payload operations center (HPC) configured to generate encrypted host commands in accordance with host user requests and to transmit the host commands to the vehicle via a host CMD path; wherein the host payload is to generate encrypted host telemetry (TLM), and the hosted payload is to generate encrypted hosted TLM; wherein the vehicle is to transmit the host TLM to the HPC via a host TLM path; and wherein the vehicle is to transmit the hosted TLM to the HOC via a hosted TLM path.

In one or more embodiments, a method comprises: generating encrypted hosted commands by a hosted payload operations center (HOC) in accordance with hosted user requests to control operations of a hosted payload on a vehicle; transmitting the hosted commands to the vehicle via a hosted command (CMD) path; generating encrypted host commands by a host payload operations center (HPC) in accordance with host user requests to control operations of a host payload on the vehicle; transmitting the host commands to the vehicle via a host CMD path; generating encrypted host telemetry (TLM) by the host payload; generating encrypted hosted TLM by the hosted payload; transmitting the host TLM to the HPC by the vehicle via a host TLM path; and transmitting the hosted TLM to the HOC by the vehicle via a hosted TLM path.

The features, functions, and advantages can be achieved independently in various embodiments of the present disclosure or may be combined in yet other embodiments.

The invention is defined by the appended claims.

BRIEF DESCRIPTION OF DRAWINGS

These and other features, aspects, and advantages of the present disclosure will become better understood with regard to the following description, appended claims, and accompanying drawings where:

FIGS. 13A-13N list scenarios each of which defines a combination of transmission paths for host and hosted commands and for host and hosted telemetry according to some embodiments of the present disclosure.

DESCRIPTION

Figure 1A:
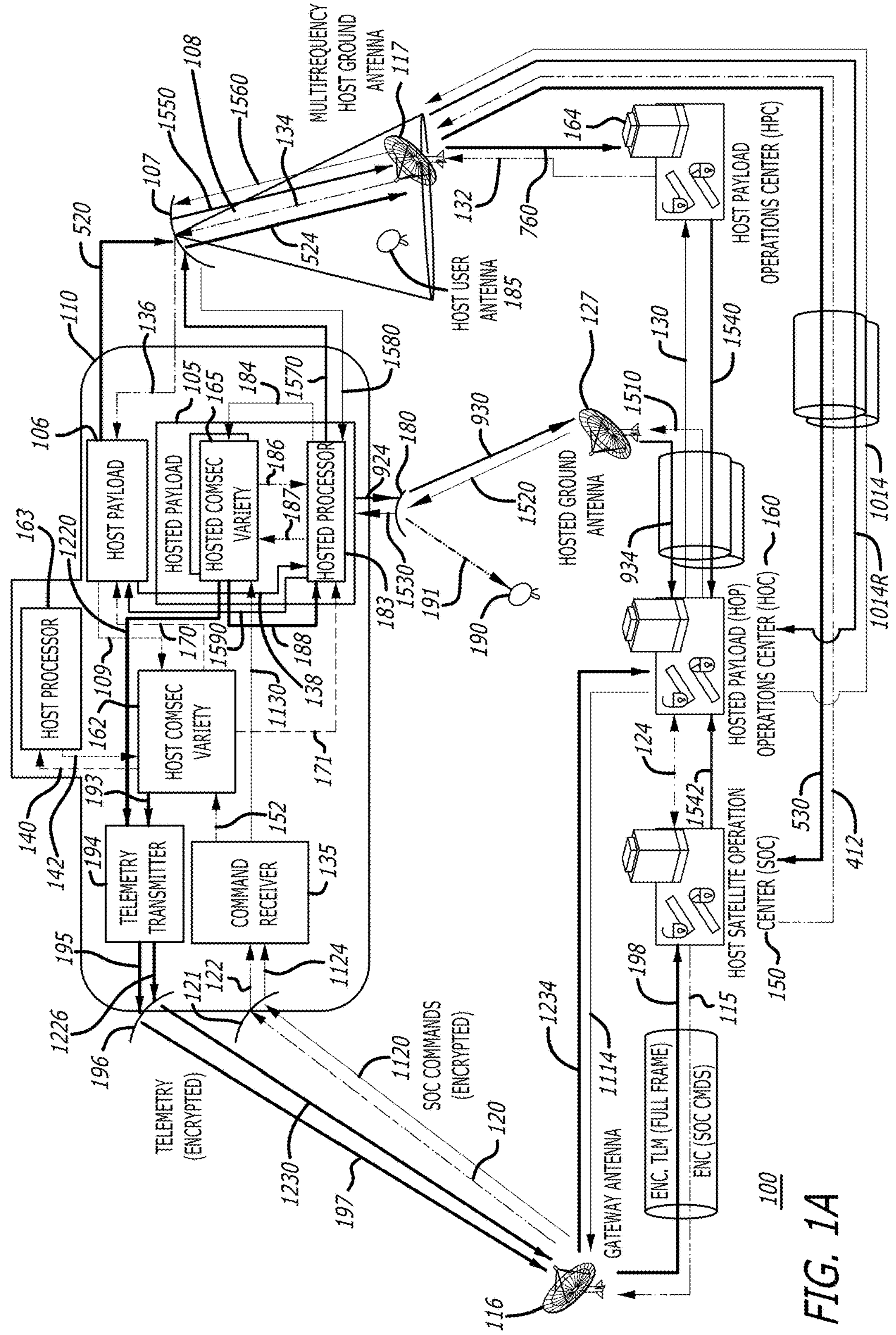
FIGS. 1A, 1B show the disclosed system for hosted payload operations with secured independent communications utilizing a multi-frequency host ground antenna, where the host commands and host telemetry can be transmitted out-of-band, in accordance with at least one embodiment of the present disclosure.

The methods and apparatus disclosed herein provide an operative system for hosted payload operations with secured independent communications. Some embodiments utilize a multi-frequency host in-band ground antenna.

As previously mentioned above, currently, typical payload operations for a vehicle (e.g., a satellite) have the ability to command the payload on the vehicle from a Satellite Operations Center (SOC). There are also some operators that perform payload operations form a separate payload operations center where the payload is controlled. The payload commands are communicated via a command path that can be transmitted to the vehicle via either in-band or out-of-band communications through ground antennas.

Some embodiments of the disclosed system allow for control that provides vehicle users the ability to securely, dynamically, allocate resources (e.g., a host payload and/or a hosted payload) on demand.

It should be noted that the host payload and/or the hosted payload for some embodiments of the disclosed system may employ various different types of transponders including, but not limited to, various different types of digital transponders, various different types of analog transponders (e.g., conventional repeater-type transponders), and various different types of combination analog/digital transponders.

It should be noted that in this disclosure, in-band frequency band(s) refer to a frequency band(s) that is the same frequency band(s) utilized to transmit payload data (user data, e.g., host payload data and/or hosted payload data); and out-of-band frequency band(s) refer to a frequency band(s) utilized to transmit vehicle commands and telemetry. Out-of-band transmissions typically have lower data rates than in-band transmissions. Commands and telemetry can be transmitted in-band or out-of-band as described herein.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to satellite communication systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1B:
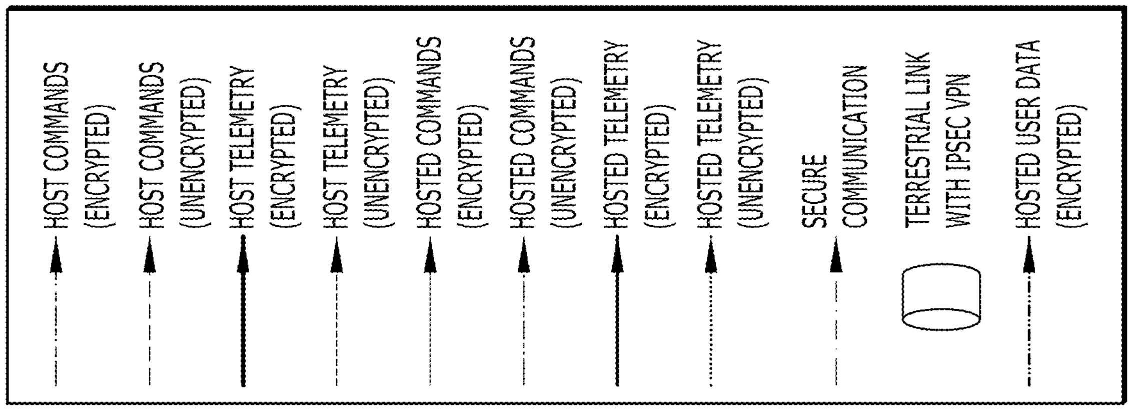

FIGS. 1A, 1B illustrate a system 100 that performs host and hosted payload operations with secure independent communications in which the hosted payload operations utilize a host payload operations center, in accordance with one or more embodiments of the present disclosure. Referring to FIG. 1A, a vehicle 110, a host satellite operations center (SOC) 150, a hosted payload (HOP) operation center (HOC) 160, and a host payload operations center (HPC) 164 are shown. Various types of vehicles may be employed for the vehicle 110, including, but not limited to, an airborne vehicle, among other vehicle types. Exemplary vehicle types include, but are not limited to, a satellite, an aircraft, an unmanned aerial vehicle (UAV), and a space plane.

In the case of a satellite being employed for the vehicle 110, it should be noted that satellites typically include computer-controlled systems. A satellite generally includes a bus and a payload (e.g., a host payload 106 and/or a hosted payload(s) 105). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. It should be noted that, in one or more embodiments, the satellite (i.e. the vehicle 110) comprises multiple separate payloads, which are a host payload 106 and a hosted payload(s) 105. Different entities may use the different payloads on the satellite. For example, a host user (e.g., an owner of the satellite) may utilize the host payload 106, and the host user may lease out a hosted payload 105 to a hosted user (e.g., a customer) that utilizes the hosted payload 105.

Leasing a payload(s) (e.g., a hosted payload(s)) to a customer(s) may increase the revenues that a user (e.g., the host user) of a satellite can obtain. Further, a customer may use a subset of the total resources in a satellite for a cost that is less than the cost for the customer to purchase and operate a satellite, to build and operate a satellite, or to lease an entire satellite.

Communications between the host and hosted payloads 106/105 on the one hand and the SOC 150, the HPC 164, and the HOC 160 on the other hand include user data, e.g. encoded content of telephone or radio transmissions, and include commands and telemetry. The commands (CMD) are sent to the vehicle 110 to control (e.g. reconfigure) the vehicle 110 or the host or hosted payloads 106/105. The telemetry (TLM) is generated by the vehicle 110 or host or hosted payloads 106, 105 and transmitted to the host SOC 150, the HPC 164, and/or the HOC 160. Various communication paths can be established for the commands or telemetry as summarized in FIGS. 13A-13N. Each "scenario" in FIGS. 13A-13N denotes four communication paths: one path for Host CMD, one path for Host TLM, one path for Hosted CMD, and one path for Hosted TLM. The system 100 of FIG. 1A is suitable to perform Scenario 1 (FIG. 13A) and some other scenarios. In Scenario 1, the host CMD and TLM can be transmitted out-of-band ("Outband" in FIG. 13A) through a host gateway antenna 116 (FIG. 1A). And the hosted CMD and TLM can be transmitted in-band through the HPC 164 and a host ground antenna 117. (As noted above, out-of-band transmissions may have lower data rates than in-band transmissions.) The system 100 of FIG. 1A can also be used for the other Scenarios.

FIG. 1A also shows a hosted ground antenna 127, which is not used for some of the scenarios (e.g. Scenarios 1, 5, 9, and 13), and may be omitted in the embodiments limited to such scenarios. However, hosted ground antenna 127 can be used as "Hosted Ground Antenna" listed in the "Hosted CMD" and/or "Hosted TLM" columns of FIG. 13A for Scenarios 2-4, 6-8, 10-12, 14-16, and others.

A system may implement multiple scenarios, possibly all of the scenarios shown in FIGS. 13A-13N and/or additional scenarios, thus providing a rich variety of redundant paths for host and hosted CMD and TLM to increase the CMD and TLM transmission bandwidth and reliability. In some embodiments, the host CMD and/or TLM paths are used to transmit the hosted CMD and/or TLM, allowing the system to be simplified (e.g. by eliminating the hosted ground antenna 127) while still keeping the hosted CMD/TLM secret from host users.

More particularly, the hosted CMD or TLM may be encrypted to be kept secret from host entities such as SOC 150, HPC 164, and host payload 106. In particular, the hosted CMD and TLM may be encrypted using a hosted communication security (COMSEC) variety, whereas the host CMD and TLM may be encrypted using a host communication security (COMSEC) variety. Each of the host and hosted COMSEC varieties may include at least one encryption key and/or at least one algorithm (e.g., a Type 1 encryption algorithm or a Type 2 encryption algorithm).

The host CMD/TLM may be secret from the hosted entities such as HOC 160 or hosted payload 105. Further, the hosted CMD/TLM may be double encrypted, first by the hosted COMSEC variety and then by the host COMSEC variety, to be secure from third parties.

FIGS. 13A-13N define groups of scenarios as described below, and in some embodiments a system may implement all the scenarios in one of more of the groups, possibly but not necessarily in all the groups. The groups are as follows:

Group 1: HOC to Host Payload Ops Center (HPC) to Host Ground Antenna to Host Payload, Scenarios 1-16.

Group 2: HOC direct to Host Ground Antenna to Host Payload, Scenarios 17-28.

Group 3: HOC to Multi-Frequency Host Ground Antenna to Hosted Payload, Scenarios 29-40.

Group 4: HOC direct to Out of Band Host Gateway Antenna, Scenarios 41-52.

Group 5: HOC to HPC to Host Ground Antenna to Host Payload & HOC direct to Host Ground Antenna to Host Payload, Scenarios 53-60.

Group 6: HOC to HPC to Host Ground Antenna to Host Payload & HOC direct to Multi-Frequency Host Ground Antenna to Hosted Payload, Scenarios 61-68.

Group 7: HOC to HPC to Host Ground Antenna to Host Payload & HOC direct to Out-of-Band Host Gateway Antenna, Scenarios 69-76.

Group 8: HOC direct to Host Ground Antenna to Host Payload & HOC direct to Multi-Frequency Host Ground Antenna to Hosted Payload, Scenarios 77-84.

Group 9: HOC direct to Host Ground Antenna to Host Payload & HOC direct to Out-of-Band Host Gateway Antenna, Scenarios 85-92.

Group 10: HOC direct to Multi-Frequency Host Ground Antenna to Hosted Payload & HOC direct to Out-of-Band Host Gateway Antenna, Scenarios 93-100.

Group 11: HOC to HPC to Multi-Frequency Host Ground Antenna to Hosted Payload & HOC direct to Out-of-Band Host Gateway Antenna, Scenarios 101-108.

Group 12: HOC to HPC to Multi-Frequency Host Ground Antenna to Hosted Payload & HOC to Host Ground Antenna to Hosted Payload, Scenarios 109-120.

Group 13: HOC to HPC to Multi-Frequency Host Ground Antenna to Hosted Payload & HOC direct to Host Ground Antenna to Host Payload, Scenarios 121-128.

Group 14: HOC to HPC to Multi-Frequency Host Ground Antenna to Hosted Payload & HOC direct to Multi-Frequency Host Ground Antenna to Hosted Payload, Scenarios 129-136.

In some embodiments the system may switch dynamically (i.e. during operation) between the scenarios within a single group, for example based on the resource availability or load balancing. For example, Scenario 13 uses "Host Ground Antenna" (such as antenna 117 in FIG. 1A) for host commands ("Host CMD) as well as for host telemetry ("Host TLM"), hosted commands ("Hosted CMD"), and hosted telemetry ("Hosted TLM"). To reduce the demand for the Host Ground Antenna, the system may switch to Scenario 3, in which only the Hosted TLM path uses the Host Ground Antenna. In some embodiments, the system may dynamically switch between scenarios within a single group or in different groups. In some embodiments, each path may be switched to a different path without switching the other paths. In other embodiments, the switching is by scenarios (from one scenario to another), not by individual paths.

Some features of some embodiments of the system and methods described herein are also described in U.S. Pat. No. 11,201,707 B2, incorporated herein by reference.

Now exemplary paths used in the scenarios will be described in detail.

Host CMD Via "Outband" (e.g. Scenarios 1-8, 17-22, 29-34, 41-46, 53-56, 61-64, 69-72, 77-80. 85-88, 93-96, 101-104, 109-114, 121-124, 129-132). See FIG. 2.

The "Outband" host CMD path includes a path from the host SOC 150 to host payload 106, and may traverse the following entities in the order recited: host SOC 150, host gateway antenna 116, command receive antenna 121 (out-of-band reception), command receiver 135, host communication security module 162, host payload 106 (e.g. host processor 163).

Figure 2:
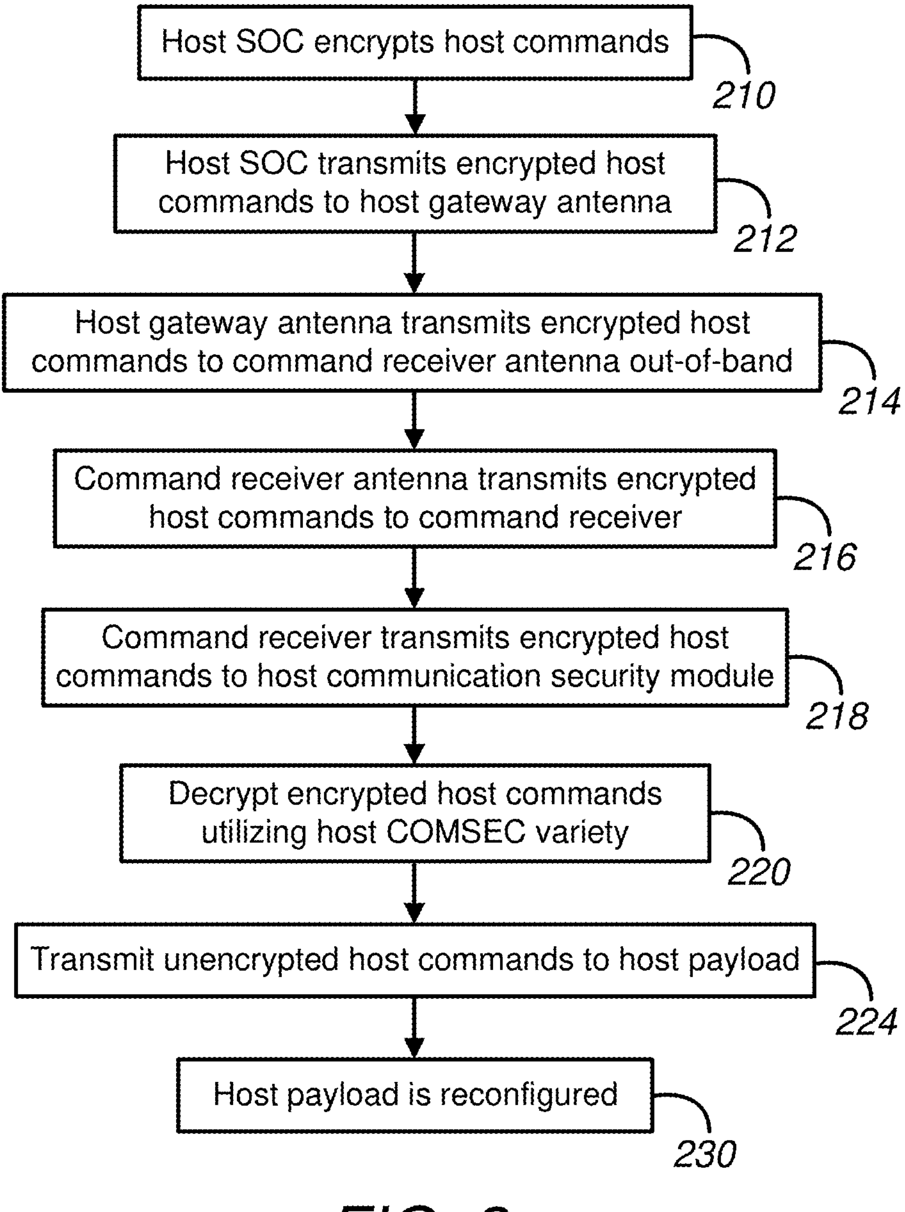
FIGS. 2, 3, 4, 5, 6, 7, 8, 9, 10, 11, and 12 are flowcharts for the disclosed systems and method for hosted payload operations with secured independent communications utilizing a multi-frequency host ground antenna, where the host commands and host telemetry can be transmitted out-of-band, in accordance with at least one embodiment of the present disclosure.

As shown in the example of FIG. 2, host SOC 150 encrypts (210 in FIG. 2) unencrypted host commands (i.e. Unencrypted SOC Commands), by utilizing the host COMSEC variety, to produce encrypted host commands (i.e. encrypted SOC Commands). Host commands are commands that are used to configure the host payload 106 that is utilized by the host SOC 150.

The host SOC 150 then transmits (115 in FIGS. 1A, 212 in FIG. 2) the encrypted host commands to the host gateway antenna 116, which may be a ground antenna. Then, the host gateway antenna 116 transmits (120 in FIG. 1A, 214 in FIG. 2) the encrypted host commands to command receive antenna 121 on the vehicle 110. The host gateway antenna 116 transmits the encrypted host commands utilizing an out-of-band frequency band(s) (i.e. a frequency band(s) that is not the same frequency band(s) utilized to transmit host or hosted user payload data).

The command receive antenna 121 on the vehicle 110 then transmits (122 in FIG. 1A, 216 in FIG. 2) the encrypted host commands to a command receiver 135.

The command receiver 135 then transmits (152 in FIG. 1A, 218 in FIG. 2) the encrypted host commands to a host communication security module 162. Host communication security module 162 decrypts 220 the encrypted host commands by utilizing the host COMSEC variety to generate unencrypted host commands.

It should be noted that the host communication security module 162 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 162 may comprise one or more processors.

The host communication security module 162 then transmits (170 in FIG. 1A, 224 in FIG. 2) the unencrypted host commands to the host payload 106 (e.g., to a host processor 163 on the host payload 106). The host payload 106 is reconfigured 230 (e.g., by the host processor 163) according to the unencrypted host commands. The reconfiguring of the host payload 106 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the host payload 106 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload 106 includes one or more processors.

After the host payload 106 is reconfigured, host user data may be transmitted between a host payload antenna 107 (e.g., via one or more antenna beams 108) and a host user antenna 185. The host user antenna 185 may be airborne (e.g., located on an aircraft or satellite) or marine (e.g., located on a ship) or terrestrial (e.g., located on the ground).

Also, it should be noted that, although in FIG. 1A, antenna beam 108 is shown to include a single circular spot beam; in other embodiments, the antenna beam 108 may include more than one beam as is shown in FIG. 1A. For example, antenna beam 108 may include multiple beams, and antenna beam 108 may include beams of different shapes than the circular spot beam as is shown in FIG. 1A (e.g., antenna beam 108 may include elliptical beams and/or shaped beams of various different shapes).

It should be noted that in one or more embodiments, the host payload antenna 107 may comprise one or more reflector dishes including, but not limited to, parabolic reflectors and/or shaped reflectors. In some embodiments, the host payload antenna 107 may comprise one or more multi-feed antenna arrays.

Also, the host communication security module 162 may transmit 171 the unencrypted host commands to the hosted payload 105 to command the hosted payload 105 on or off according to the unencrypted host commands.

Host TLM Via "Outband" (e.g. Scenarios 1-4, 9-12, 17-19, 23-25, 29-31, 35-37, 41-43, 47-49, 53-54, 57-58, 61-62, 65-66, 69-70, 73-74, 77-78, 81-82, 85-86, 89-90, 93-94, 97-98, 101-102, 105-106, 109-111, 115-117, 121-122, 125-126, 129-130, 133-134). See FIG. 3.

The "Outband" host TLM path includes a path from host payload 106 to host SOC 150, and may traverse the following entities in the order recited: host payload 106, host communication security module 162, telemetry transmitter 194, telemetry antenna 196, host gateway antenna 116 (out-of-band reception), host SOC 150.

Figure 3:
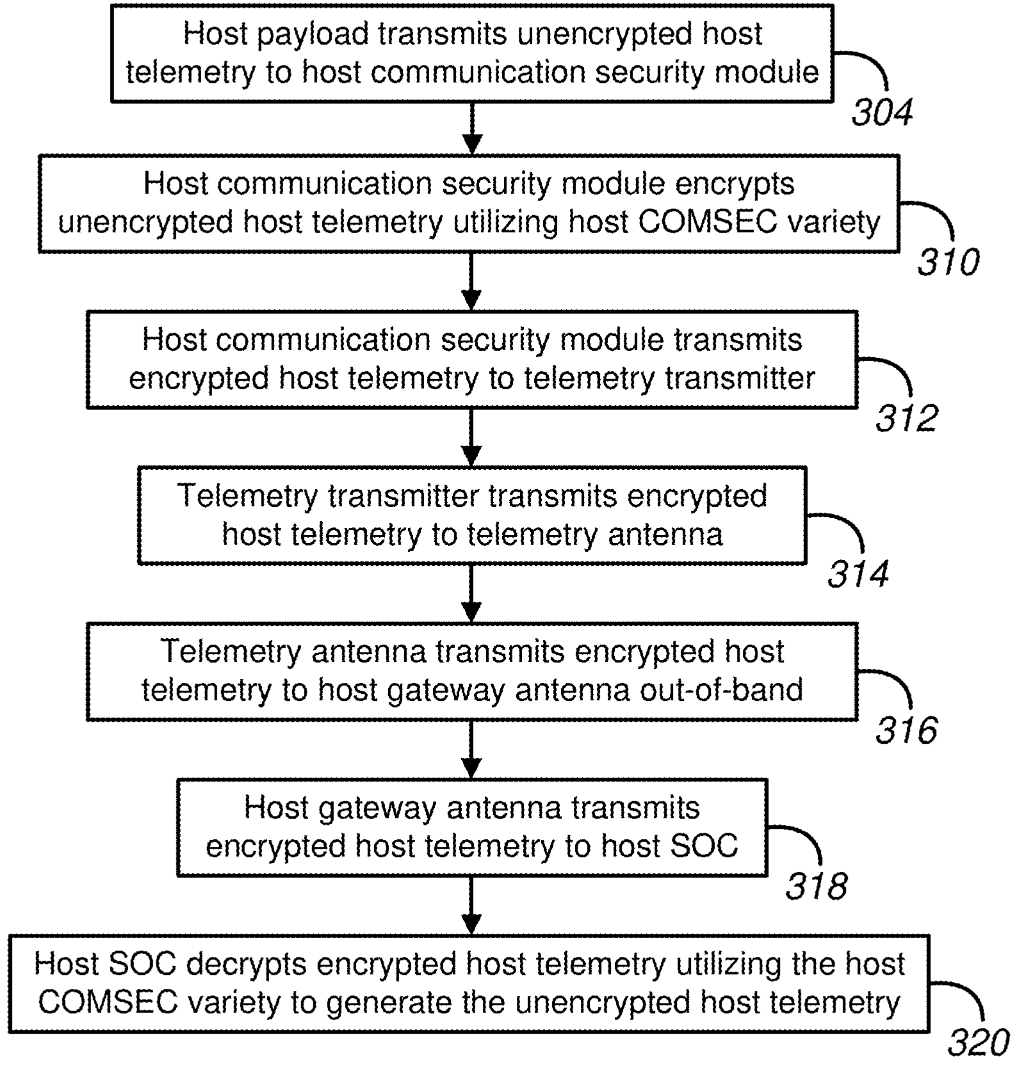

In the example of FIG. 3, the host payload 106 transmits (109 in FIG. 1A, 304 in FIG. 3) unencrypted host telemetry (i.e. unencrypted SOC Telemetry, which is telemetry data related to the host payload 106 that is utilized by the host SOC 150) to the host communication security module 162. The host communication security module 162 then encrypts 310 the unencrypted host telemetry utilizing the host COMSEC variety to generate encrypted host telemetry (i.e. encrypted SOC Telemetry).

The host communication security module 162 then transmits (193 in FIG. 1A, 312 in FIG. 3) the encrypted host telemetry to telemetry transmitter 194. The telemetry transmitter 194 then transmits (195, 314) the encrypted host telemetry to telemetry antenna 196. The telemetry antenna 196 then transmits (197,316) the encrypted host telemetry to the host gateway antenna 116. The telemetry antenna 196 transmits the encrypted host telemetry utilizing an out-of-band frequency band(s).

The host gateway antenna 116 transmits 198 the encrypted host telemetry to the host SOC 150. The host SOC 150 then decrypts 320 the encrypted host telemetry utilizing the host COMSEC variety to generate the unencrypted host telemetry.

Host CMD "Via Host Ground Antenna" (Scenarios 9-16, 23-28, 35-40, 47-52, 57-60, 65-68, 73-76, 81-84, 89-92, 97-100, 105-108, 115-120, 125-128, 133-136). See FIG. 4.

The host CMD and/or TLM can be optionally transmitted in-band between the HPC 164 or SOC 150 and host payload 106 "via Host Ground Antenna" 117, possibly together with host or hosted user data. The host CMD path may traverse the following entities in the order recited: HPC 164 or SOC 150, host ground antenna 117, host payload antenna 107 (in-band), host payload 106, host communication security module 162, host processor 163.

Figure 4:
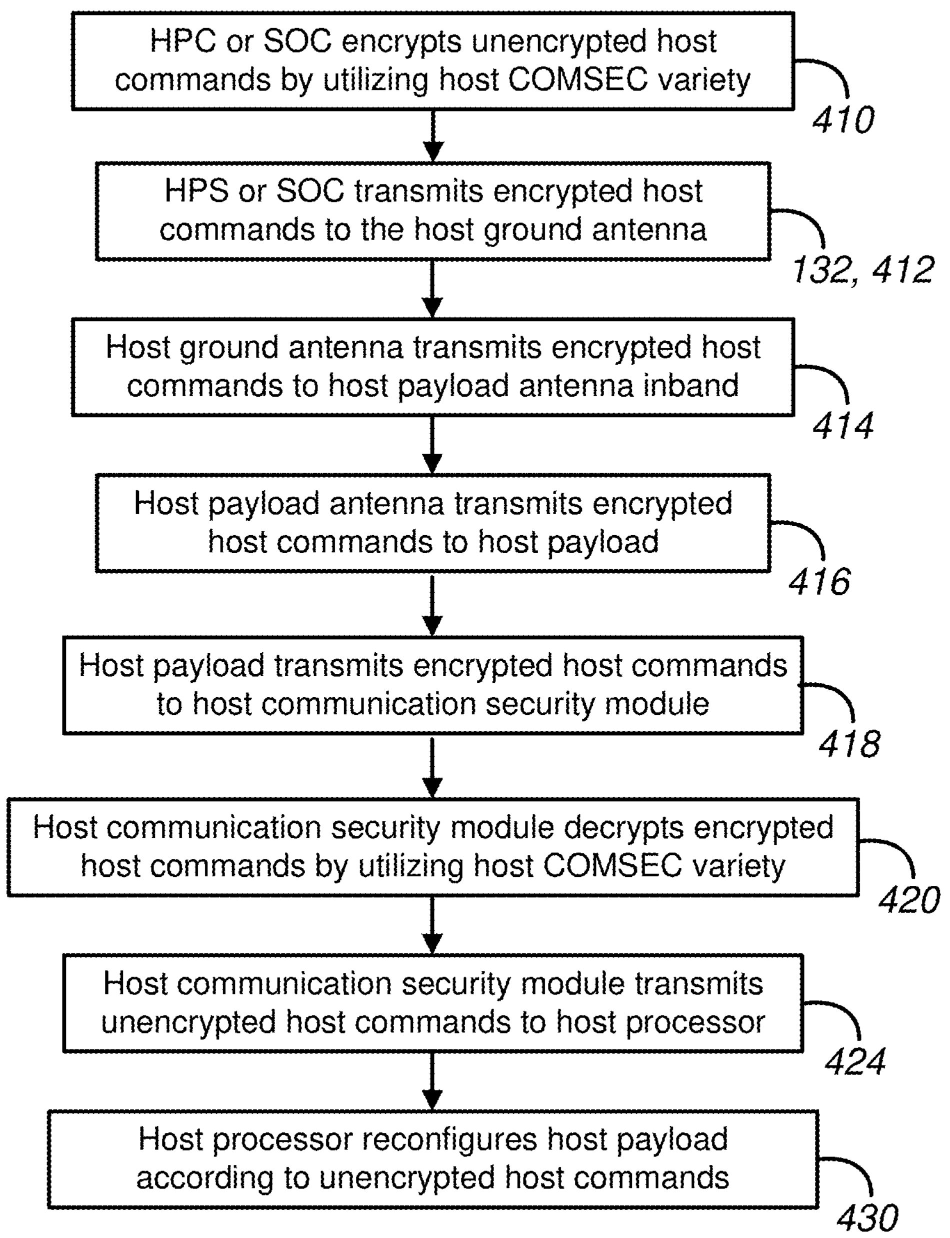

In the example of FIG. 4, the HPC 164 or SOC 150 encrypts 410 unencrypted host commands (i.e. Unencrypted HPC Commands) by utilizing the host COMSEC variety, to produce encrypted host commands (i.e. encrypted HPC Commands). The host commands are commands that are used to configure the host payload 106 that is utilized by the HPC 164 or SOC 150.

HPC 164 or SOC 150 may transmit (132,412) the encrypted host commands to the host ground antenna 117. The host ground antenna 117 may transmit (134,414) the encrypted host commands to the host payload antenna 107 in-band, on the same frequency band as used for host user data transmission. Hence, the encrypted host commands can be transmitted together with host user data (for example, in the same data frame or packet). In some embodiments, the HPC 164 or SOC 150 encrypts the host user data and provides the encrypted host user data and the encrypted host commands to the host ground antenna 117 for in-band transmission to the host payload antenna 107.

HPC 164 or SOC 150 may also encrypt the hosted commands received from the HOC 160 and transmit the encrypted hosted commands together with the encrypted host commands and encrypted host user data to the host ground antenna 117 for in-band transmission to the host payload antenna 107, as described below in connection with the Hosted CMD processing in Scenario 1 and other Scenarios transmitting Hosted CMD "via HPC and Host Ground Antenna".

In some embodiments, the system may include a communications link 124 between the host SOC 150 and the HOC 160. The communications link 124 may facilitate communications between the host SOC 150 and the HOC 160 to coordinate transmission of the encrypted host commands via the host ground antenna 117 (the HOC 160 may use the host ground antenna 117 for the hosted CMD or TLM paths bypassing the HPC 164 and/or SOC 150 and marked "via Hosted Ground Antenna" in scenarios such as 3-4 as described below). For example, the communications link 124 may allow the HOC 160 to request control of host ground antenna 117 via communications with the host SOC 150. Communications link 124 may also allow the host SOC 150 to respond to the antenna control request.

As further shown in FIGS. 1A and 4, the host payload antenna 107 may transmit (136,416) the encrypted host commands (possibly with encrypted user data and encrypted hosted commands) to the host payload 106. The host payload 106 may transmit (109,418) the encrypted host commands (possibly with encrypted user data and encrypted hosted commands) to the host communication security module 162. Of note, the encrypted hosted commands may include double encryption, first with the hosted COMSEC variety and then with the host COMSEC variety. Host communication security module 162 decrypts the encrypted host commands (possibly with encrypted user data and encrypted hosted commands) by utilizing the host COMSEC variety to generate unencrypted host commands and user data, and remove the host COMSEC variety encryption from the hosted commands. The host communication security module 162 then transmits (140,424) the unencrypted host commands to the host processor 163. The host payload 106 is reconfigured 430 by the host processor 163 according to the unencrypted host commands. The reconfiguring of the host payload 106 may include adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the host payload 106 may comprise reconfiguring at least one antenna, converter, beamformer, channelizer, demodulator, modulator, switch matrix, or combiner.

Host TLM "Via Host Ground Antenna" (e.g. Scenarios 5-8, 13-16, 20-22, 26-28, 32-24, 38-40, 44-46, 50-52, 55-56, 59-60, 63-64, 67-68, 71-72, 75-76, 79-80, 83-84, 87-88, 91-92, 95-96, 99-10, 103-104, 107-108, 112-114, 118-120, 123-124, 127-128, 131-132, 135-136). See FIG. 5.

The Host TLM path "via Host Ground Antenna" may be the reverse of the Host CMD path "via Host Ground Antenna" described above, and may traverse the following entities in the order recited: host processor 163, host communication security module 162, host payload 106, host payload antenna 107, host ground antenna 117 (in-band), HPC 164 or SOC 150.

Figure 5:
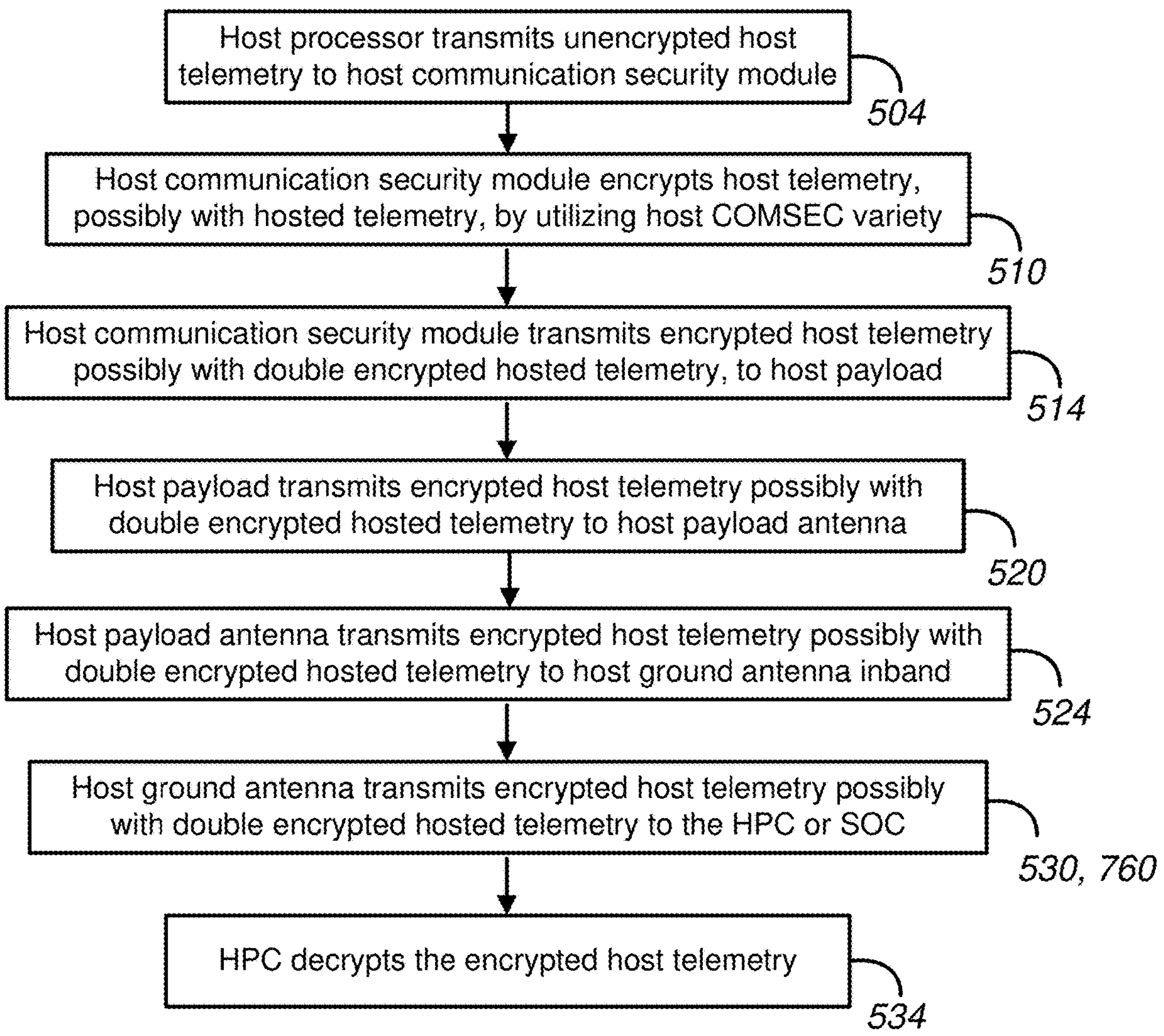

In the example of FIG. 5, host processor 163 may transmit (142,504) unencrypted host telemetry to host communication security module 162. The host communication security module 162 may also receive unencrypted host user data and/or receive hosted telemetry encrypted with hosted COMSEC variety. Host communication security module 162 may then encrypt 510 the host telemetry possibly together with host user data and encrypted hosted telemetry, by utilizing the host COMSEC variety. Host communication security module 162 may then transmit (170,514) the encrypted host telemetry possibly with encrypted host user data and/or double encrypted hosted telemetry to host payload 106. From the host payload 106, the encrypted host telemetry possibly with encrypted host user data and double encrypted hosted telemetry is transmitted 520 to the host payload antenna 107, then in-band 524 to the host ground antenna 117, and then 760 to the HPC 164 or 530 to SOC 150 (see the box labeled "530, 760" in FIG. 5). HPC 164 or SOC 150 may decrypt 534 the encrypted host telemetry and encrypted host user data to recover unencrypted host telemetry and unencrypted host user data. HPC 164 or SOC 150 may also decrypt the double encrypted hosted telemetry to recover single encrypted hosted telemetry (encrypted with COMSEC hosted variety), and the HPC 164 sends 1540 the single encrypted hosted telemetry to HOC 160, or the SOC 150 sends 1542 the single encrypted hosted telemetry to the HOC 160.

Hosted CMD "Via HPC and Host Ground Antenna" (e.g. Scenarios 1-2, 5-6, 9-10, 13-14, 53, 55, 57, 59, 61, 63, 65, 67, 69, 71, 73, 75). See FIG. 6.

This path may traverse the following entities in the order recited: HOC 160, HPC 164, host ground antenna 117, host payload antenna 107, host payload 106, host communication security module 162, host payload 106, hosted processor 183, hosted communication security module 165, hosted processor 183.

Figure 6:
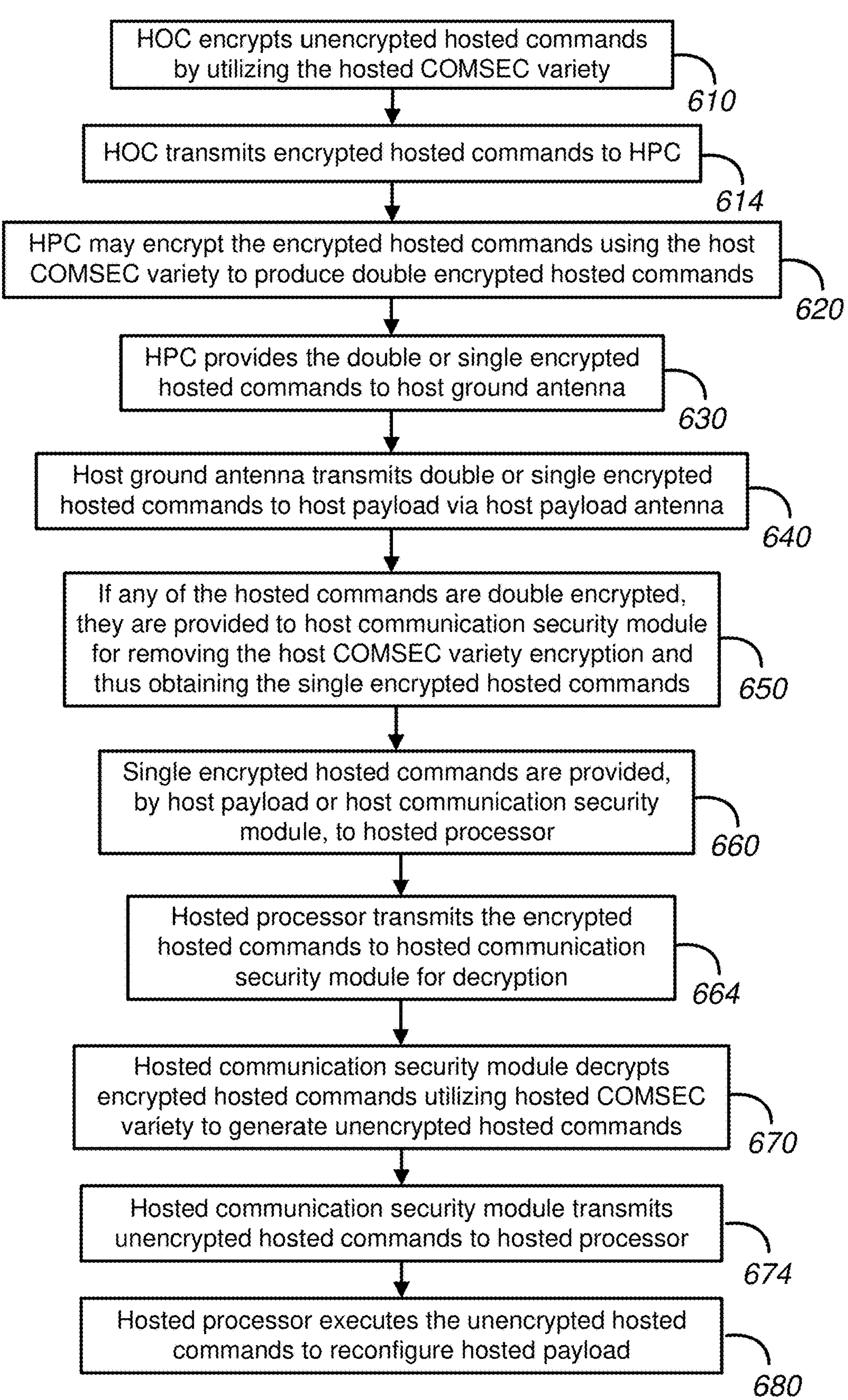

More particularly, in the example of FIG. 6, HOC 160 encrypts 610 unencrypted hosted commands (i.e. Unencrypted HOC Commands), by utilizing the hosted COMSEC variety, to produce encrypted hosted commands (i.e. encrypted HOC Commands). The hosted commands are commands that are used to configure the hosted payload 105 that is utilized by the HOC 160.

The HOC 160 may transmit (130,614) the encrypted hosted commands to the HPC 164. The HPC 164 may encrypt 620 the encrypted hosted commands by using the host COMSEC variety to produce double encrypted hosted commands, i.e. hosted commands encrypted with the hosted and then the host COMSEC varieties. Alternatively, the double encryption may be omitted. The HPC 164 may provide 630 the double or single encrypted hosted commands ("single encrypted" means encrypted without using the host COMSEC variety) to the host ground antenna 117 for transmitting 640 to the host payload 106 along the same path as for the host CMD "via Host Ground Antenna" as described above, i.e. via the host payload antenna 107 in-band. On the path from the HPC 164 to the host payload 106, the encrypted hosted commands may be combined with encrypted host commands, encrypted host user data, and/or encrypted hosted user data. For example, the encrypted hosted user data may be provided by the HOC 160 to the HPC 164 for optional double encryption and for further delivery to the host payload 106.

If any of the hosted commands or hosted user data are double encrypted, they are provided 650 to the host communication security module 162 for removing the host COMSEC variety encryption and thus obtaining the single encrypted hosted commands and hosted user data.

The single encrypted hosted commands and/or hosted user data are provided 660, by the host communication security module 162 via host payload 106 (possibly directly from the host communication security module 162 and/or other components) to the hosted processor 183 for further processing. The hosted processor 183 transmits (184,664) the encrypted hosted commands and/or the encrypted hosted user data to a hosted communication security module 165 for decryption. For example, the hosted communication security module 165 may decrypt 670 the encrypted hosted commands and/or the encrypted hosted user data by utilizing the hosted COMSEC variety to generate unencrypted hosted commands and/or unencrypted hosted user data.

It should be noted that the hosted communication security module 165 may comprise one or more communication security modules (e.g., communication security module 3 and communication security module 4, where communication security module 4 is a redundant communication security module that is utilized when there is a failure of communication security module 3), where the extra communication security modules are redundant communication security modules that are utilized when there is a communication security module failure. In addition, the hosted communication security module 165 may comprise one or more processors. In some embodiments, the hosted communication security module 165 and the hosted processor 183 are separate units, as is shown in FIG. 1A. In other embodiments, the hosted communication security module 165 and the hosted processor 183 are a single unit.

The hosted communication security module 165 then transmits (186,674) the unencrypted hosted commands to the hosted processor 183. The hosted payload 105 is reconfigured 680 by the hosted processor 183 according to the unencrypted hosted commands. The reconfiguring of the hosted payload 105 may comprise adjusting at least one of:

transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the hosted payload 105 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. After the hosted payload 105 is reconfigured, a hosted payload antenna 180 then transmits (191 in FIG. 1A) hosted user data to a hosted user antenna 190 on the ground in accordance with the reconfiguration. It should be noted that in other embodiments, the hosted user antenna 190 may be airborne (e.g., located on an aircraft or satellite) or marine (e.g., located on a ship) rather than terrestrial (e.g., located on the ground) as is shown in FIG. 1A.

Hosted TLM "Via HPC and Host Ground Antenna" (e.g. Scenarios 1, 3, 5, 7, 9, 11, 13, 15, 54, 56, 58, 60, 62, 64, 66, 68, 70, 72, 74, 76). See FIG. 7.

The Hosted TLM path "via HPC and Host Ground Antenna" may be the reverse of the Hosted CMD path "via HPC and Host Ground Antenna" described above in connection with Scenarios 1-2 and others.

Figure 7:
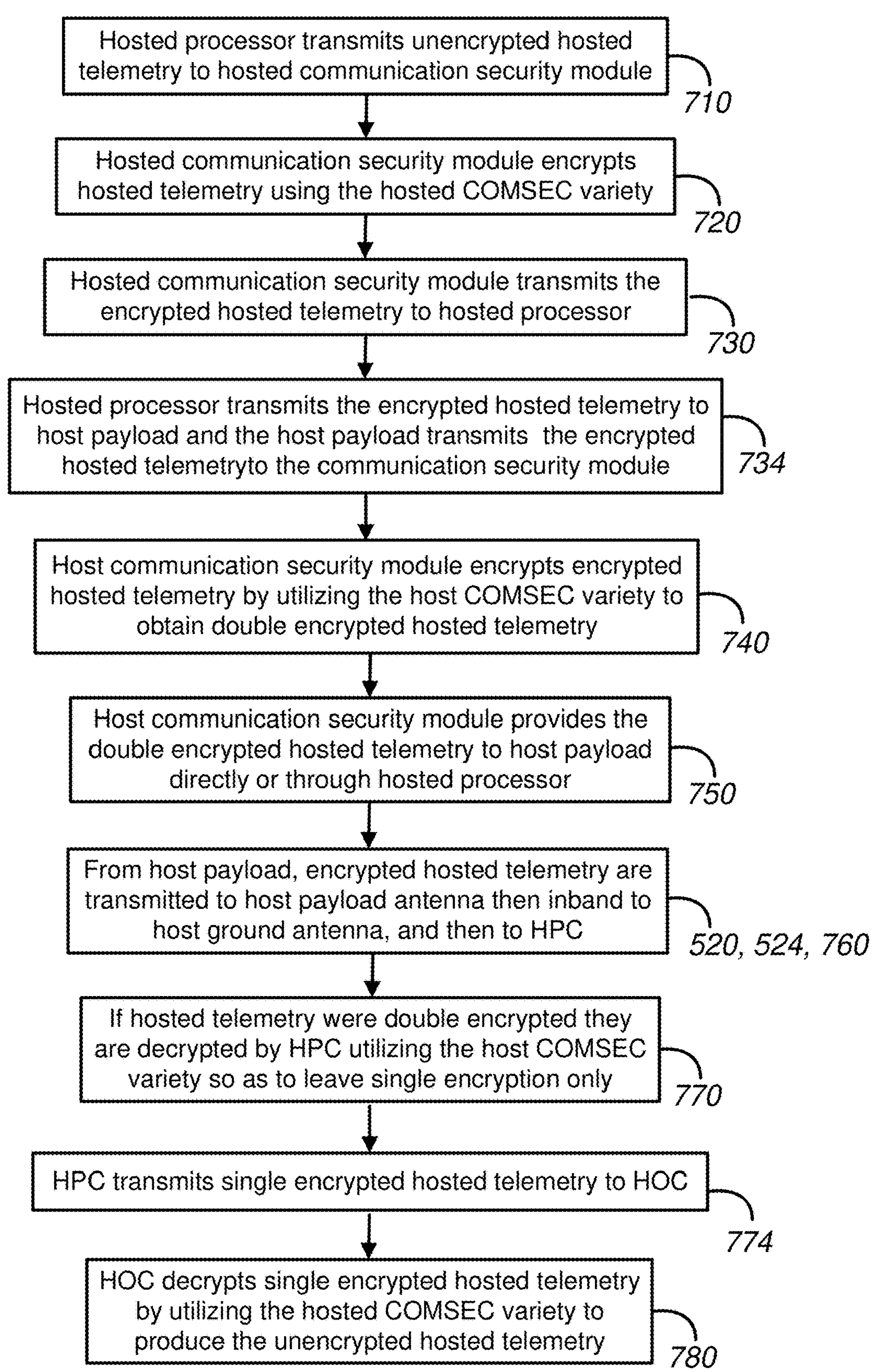

The Hosted TLM "via HPC and Host Ground Antenna" may traverse the following entities in the order recited: hosted processor 183, hosted communication security module 165, hosted processor 183, host payload 106, host communication security module 162, host payload 106, host payload antenna 107, host ground antenna 117, HPC 164, HOC 160, More particularly, in the example of FIG. 7, hosted processor 183 may transmit 710 unencrypted hosted telemetry to hosted communication security module 165. The hosted communication security module 165 may also receive unencrypted hosted user data, and encrypt 720 the hosted telemetry and/or hosted user data using the hosted COMSEC variety, and transmit 730 the encrypted hosted telemetry and/or encrypted hosted user data to hosted processor 183. Hosted processor 183 optionally transmits 734 the encrypted hosted telemetry and/or encrypted user data to the host payload 106. The host payload 106 then transmits to the host communication security module 162. Host communication security module 162 encrypts 740 the encrypted hosted telemetry and/or encrypted user data by utilizing the host COMSEC variety to obtain double encrypted hosted telemetry and/or hosted user data. The host communication security module 162 provides 750 the double encrypted hosted telemetry and/or hosted user data to host payload 106 directly or through hosted processor 183.

From the host payload 106 (see the box marked "520, 524, 760" in FIG. 7), the encrypted hosted telemetry and/or hosted user data are transmitted 520 to the host payload antenna 107, then in-band 524 to the host ground antenna 117, and then 760 to the HPC 164.

If the hosted telemetry and/or hosted user data were double encrypted, they are decrypted 770 by HPC 164 utilizing the host COMSEC variety so as to leave single encryption only.

HPC 164 transmits 774 the single encrypted hosted telemetry and/or single encrypted hosted user data to HOC 160, where they are decrypted 780 by utilizing the hosted COMSEC variety to produce the unencrypted hosted telemetry and/or hosted user data.

Hosted CMD "Via Hosted Ground Antenna" (e.g. Scenarios 3-4, 7-8, 11-12, 15-16, 19, 22, 25, 28, 31, 34, 37, 40, 43, 46, 49, 52, 111, 114, 117, 120). See FIG. 8.

This path may traverse the following entities in the order recited: HOC 160, hosted ground antenna 127, hosted payload antenna 180 (in-band transmission, possibly together with hosted user data), hosted processor 183, hosted communication security module 165, hosted processor 183.

Figure 8:
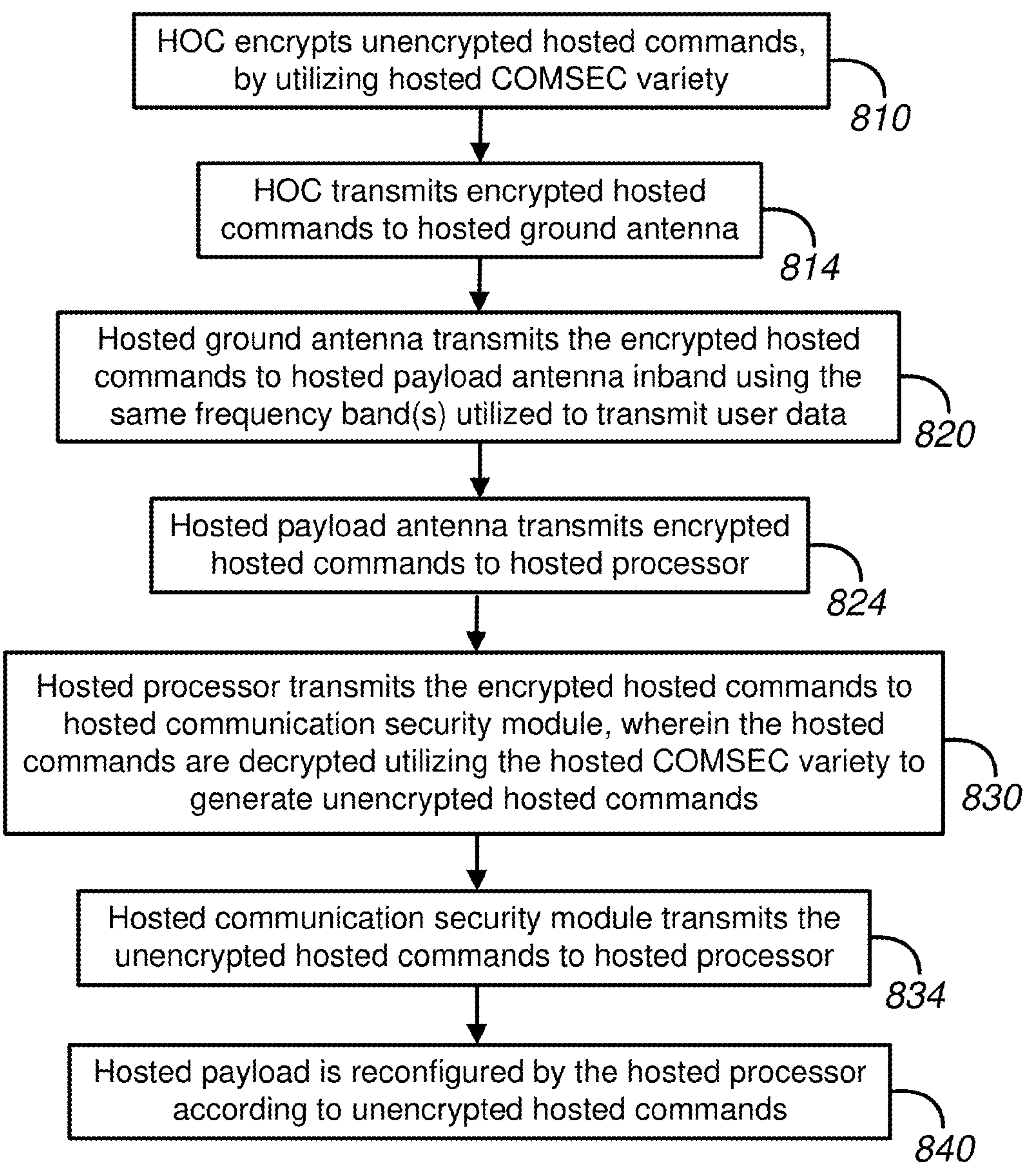

In this path, in the example of FIG. 8, HOC 160 encrypts 810 unencrypted hosted commands (i.e. Unencrypted HOC Commands), and possibly unencrypted hosted user data, by utilizing the hosted COMSEC variety. The resulting encrypted hosted commands will be used to configure the hosted payload 105 that is utilized by the HOC 160.

HOC 160 may then transmit 814 the encrypted hosted commands and/or data to the hosted ground antenna 127. Hosted ground antenna 127 transmits 820 the encrypted hosted commands to a hosted payload antenna 180 on the vehicle 110 in-band, using the same frequency band(s) utilized to transmit user data (e.g. hosted user data). The hosted payload antenna 180 on the vehicle 110 then transmits 824 encrypted hosted commands and/or user data to hosted processor 183. The hosted processor 183 transmits 830 the encrypted hosted commands and/or user data to hosted communication security module 165, wherein the hosted commands and/or user data are decrypted utilizing the hosted COMSEC variety to generate unencrypted hosted commands and/or unencrypted hosted user data.

The hosted communication security module 165 then transmits 834 the unencrypted hosted commands and/or user data to the hosted processor 183. The hosted payload 105 is reconfigured 840 by the hosted processor 183 according to the unencrypted hosted commands. The reconfiguring of the hosted payload 105 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the hosted payload 105 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

Hosted TLM "Via Hosted Ground Antenna" (e.g. Scenarios 2, 4, 6, 8, 10, 12, 14, 16, 18, 21, 24, 27, 30, 33, 36, 39, 42, 45, 48, 51, 110, 113, 116, 119). See FIG. 9.

The Hosted TLM path "via Hosted Ground Antenna" may be the reverse of the Hosted CMD path "via Hosted Ground Antenna" described above.

This Hosted TLM path "via Hosted Ground Antenna" may traverse the following entities in the order recited: hosted processor 183, hosted communication security module 165, hosted processor 183, hosted payload antenna 180, hosted ground antenna 127, HOC 160.

Figure 9:
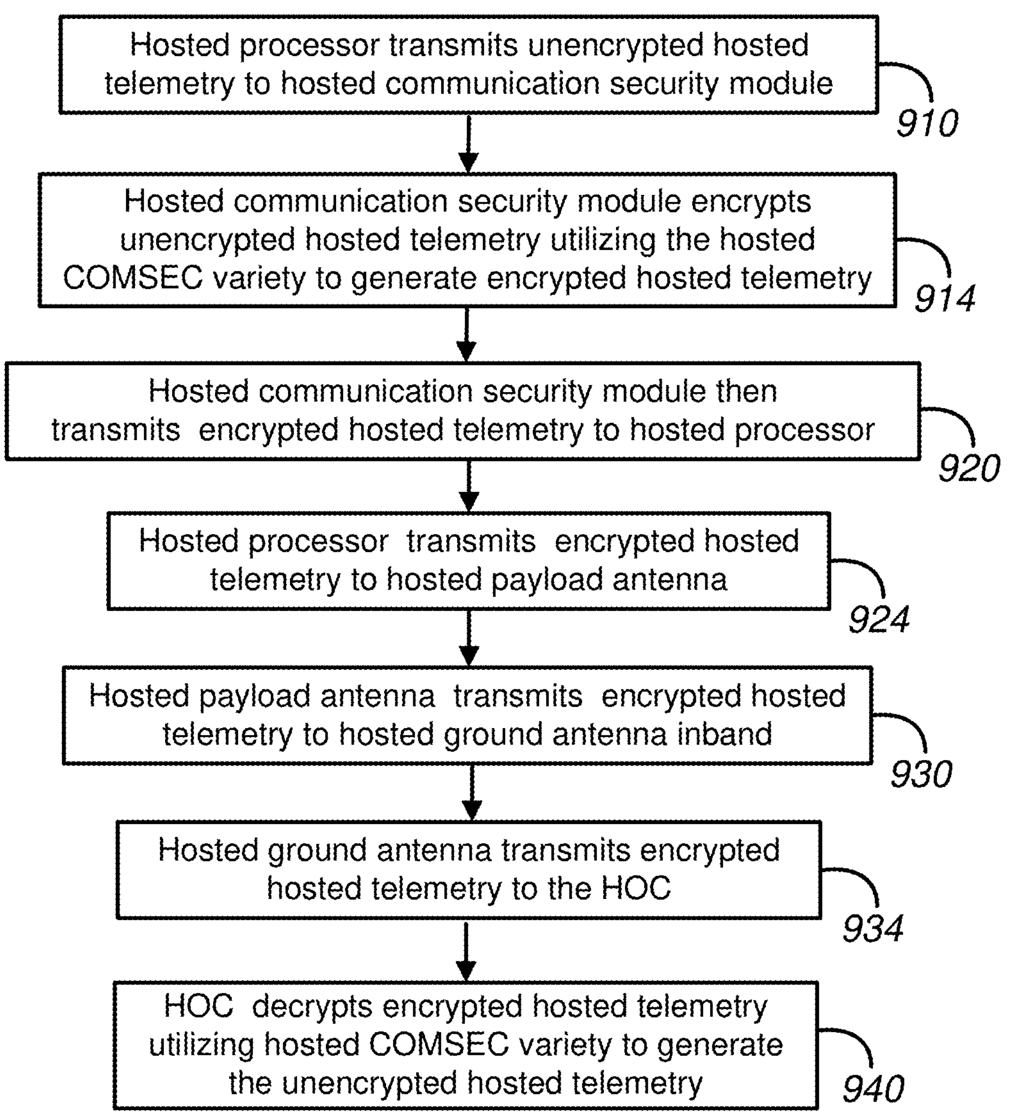

More particularly, in the example of FIG. 9, the hosted processor 183 transmits unencrypted hosted telemetry 910 (i.e. unencrypted HOC Telemetry, which is telemetry data related to the hosted payload 105 that is utilized by the HOC 160) and/or unencrypted hosted user data to the hosted communication security module 165. The hosted communication security module 165 then encrypts 914 the unencrypted hosted telemetry and/or user data utilizing the hosted COMSEC variety to generate encrypted hosted telemetry (i.e. encrypted HOC Telemetry) and/or encrypted hosted user data.

The hosted communication security module 165 then transmits 920 the encrypted hosted telemetry and/or user data to the hosted processor 183. The hosted processor 183 then transmits 924 the encrypted hosted telemetry and/or user data to the hosted payload antenna 180. The hosted payload antenna 180 then transmits 930 the encrypted hosted telemetry and/or user data to the hosted ground antenna 127 in-band. The hosted ground antenna 127 transmits 934 the encrypted hosted telemetry and/or user data to the HOC 160. The HOC 160 then decrypts 940 the encrypted hosted telemetry and/or user data utilizing the hosted COMSEC variety to generate the unencrypted hosted telemetry and/or user data.

Hosted CMD "Direct to Host Ground Antenna" (e.g. Scenarios 17-18, 20-21, 23-24, 26-27, 54, 56, 58, 60, 77, 79, 81, 83, 85, 87, 89, 91, 122, 124, 126, 128). See FIG. 10.

This path is similar to Hosted CMD "via HPC and Host Ground Antenna" (e.g. Scenario 1, "Hosted CMD") except that the HPC 164 is bypassed.

This path may traverse the following entities in the order recited: HOC 160, host ground antenna 117, host payload antenna 107 (in-band), host payload 106, hosted processor 183, hosted communication security module 165, hosted processor 183 to reconfigure the hosted payload 105.

Figure 10:
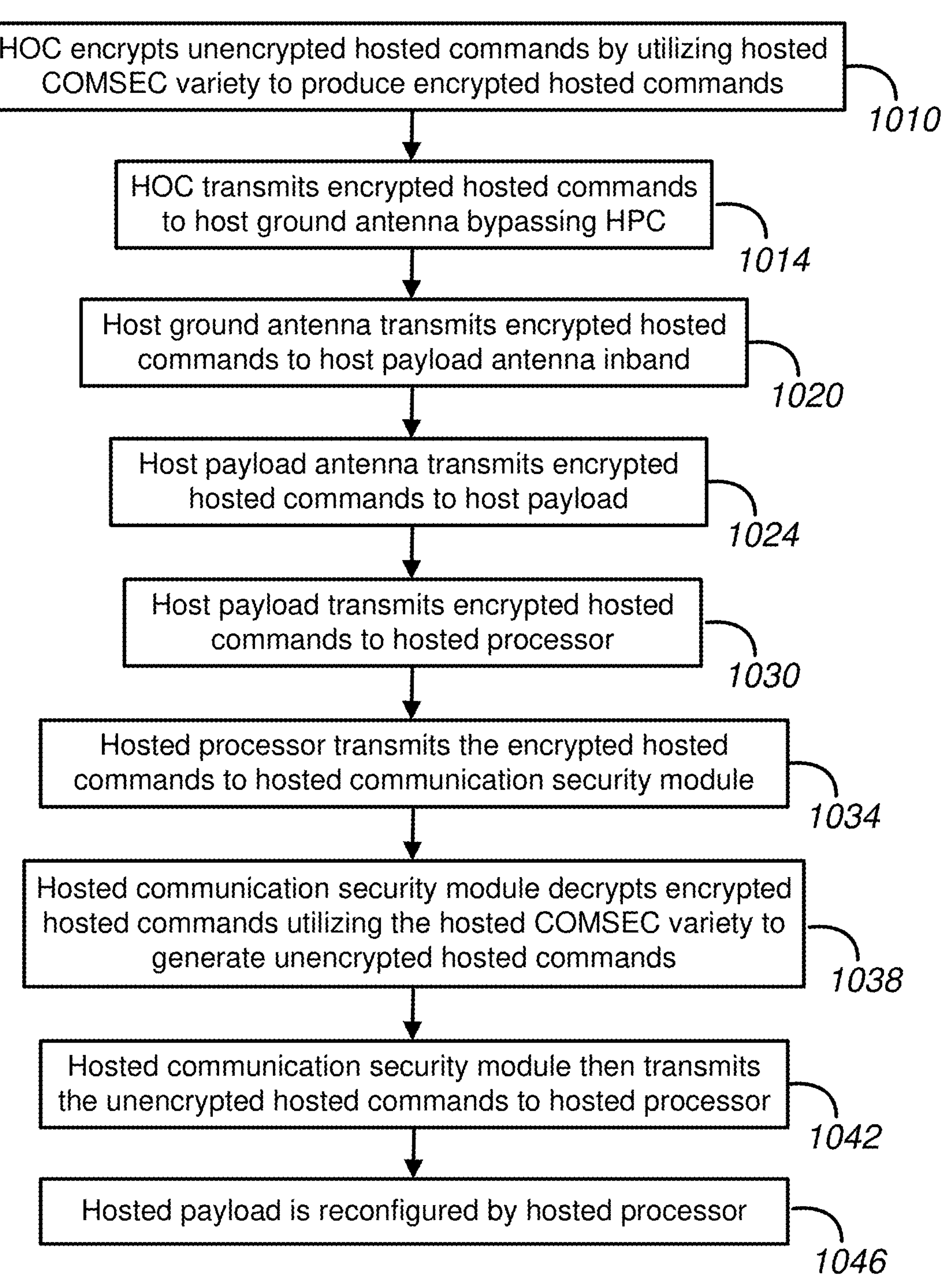

More particularly, in the example of FIG. 10, HOC 160 encrypts 1010 unencrypted hosted commands (i.e. Unencrypted HOC Commands), and possibly unencrypted hosted user data, by utilizing the hosted COMSEC variety, to produce encrypted hosted commands (i.e. encrypted HOC Commands), and possibly encrypted hosted user data. The hosted commands are commands that are used to configure the hosted payload 105 that is utilized by the HOC 160.

The HOC 160 may transmit 1014 the encrypted hosted commands, and possibly the encrypted hosted user data, to the host ground antenna 117 bypassing the HPC 164.

The host ground antenna 117 may transmit 1020 the encrypted hosted commands, and possibly the encrypted hosted user data, to the host payload antenna 107 in-band.

Host payload antenna 107 may transmit 1024 the encrypted hosted commands, and possibly the encrypted hosted user data, to the host payload 106. The host payload 106 may transmit 1030 the encrypted hosted commands, and possibly the encrypted hosted user data, to the hosted processor 183. The hosted processor 183 may transmit 1034 the encrypted hosted commands, and possibly the encrypted hosted user data, to the hosted communication security module 165 for decryption 1038 utilizing the hosted COMSEC variety to generate unencrypted hosted commands and unencrypted hosted user data.

The hosted communication security module 165 then transmits 1042 the unencrypted hosted commands to the hosted processor 183. The hosted payload 105 is reconfigured 1046 by the hosted processor 183 as described above in connection with Scenario 1 or other scenarios.

Hosted TLM "Direct from Host Ground Antenna" (Scenarios 17, 19-20, 22-23, 25-26, 28, 53, 55, 57, 59, 60, 86, 88, 90, 92, 121, 123, 125, 127)

The Hosted TLM path "direct from Host Ground Antenna" may be the reverse of the Hosted CMD path "direct to Host Ground Antenna" described above (e.g. Scenario 17), and may traverse the following entities in the order recited: hosted processor 183, hosted communication security module 165 (encryption utilizing the hosted COMSEC variety), hosted processor 183, host payload 106, host payload antenna 107, host ground antenna 117 (in-band), via link 1014R (1014 in reverse) to HOC 160 (which performs decryption utilizing the hosted COMMSEC variety) bypassing HPC 164.

This path is similar to the Hosted TLM path for Scenario 1 ("via HPC and Host Ground Antenna") except that this path bypasses the HPC and omits double encryption. Hosted user data can be encrypted and transmitted in this path with hosted TLM.

Hosted CMD "Via Multi-Frequency Host Ground Antenna" (Scenarios 29-30, 32-33, 35-36, 38-39, 62, 64, 66, 68, 78, 80, 82, 84, 93, 95, 97, 99, 130, 132, 134, 136)

This path is the same as Hosted CMD "direct to Host Ground Antenna" (e.g. Scenarios 17-18 and others as described above), except that the host ground antenna 117 is a multi-frequency antenna that can transmit both in the host and hosted in-band frequency bands when the host and hosted CMD or TLM in-band transmissions use different frequency bands. Since the host ground antenna 117 is multi-frequency, the hosted CMD/TLM may be transmitted between the host ground antenna 117 and the host payload antenna 107, coordinating between SOC 150 and HPC 164.

Hosted TLM "Via Multi-Frequency Host Ground Antenna" (Scenarios 29, 31-32, 34-35, 37-38, 40, 61, 63, 65, 67, 77, 79, 81, 83, 94, 96, 98, 100, 129, 131, 133, 135)

This path is the same as Hosted TLM "direct from Host Ground Antenna" (Scenarios 17, 19-20, and others as described above), except that the host ground antenna 117 is a multi-frequency antenna that can transmit both on the host and hosted in-band frequency bands. See the description above for Hosted CMD "via Multi-Frequency Host Ground Antenna" (e.g. Scenarios 29-30, . . . ).

Hosted CMD "Direct to Outband" (Scenarios 41-42, 44-45, 47-48, 50-51, 70, 72, 74, 76, 86, 88, 90, 92, 94, 96, 98, 100, 102, 104, 106, 108). See FIG. 11.

This path is similar to Host CMD via "Outband" (e.g. Scenarios 1-8 and others as described above) but uses HOC 160 providing hosted commands instead of SOC 150 providing host commands.

Figure 11:
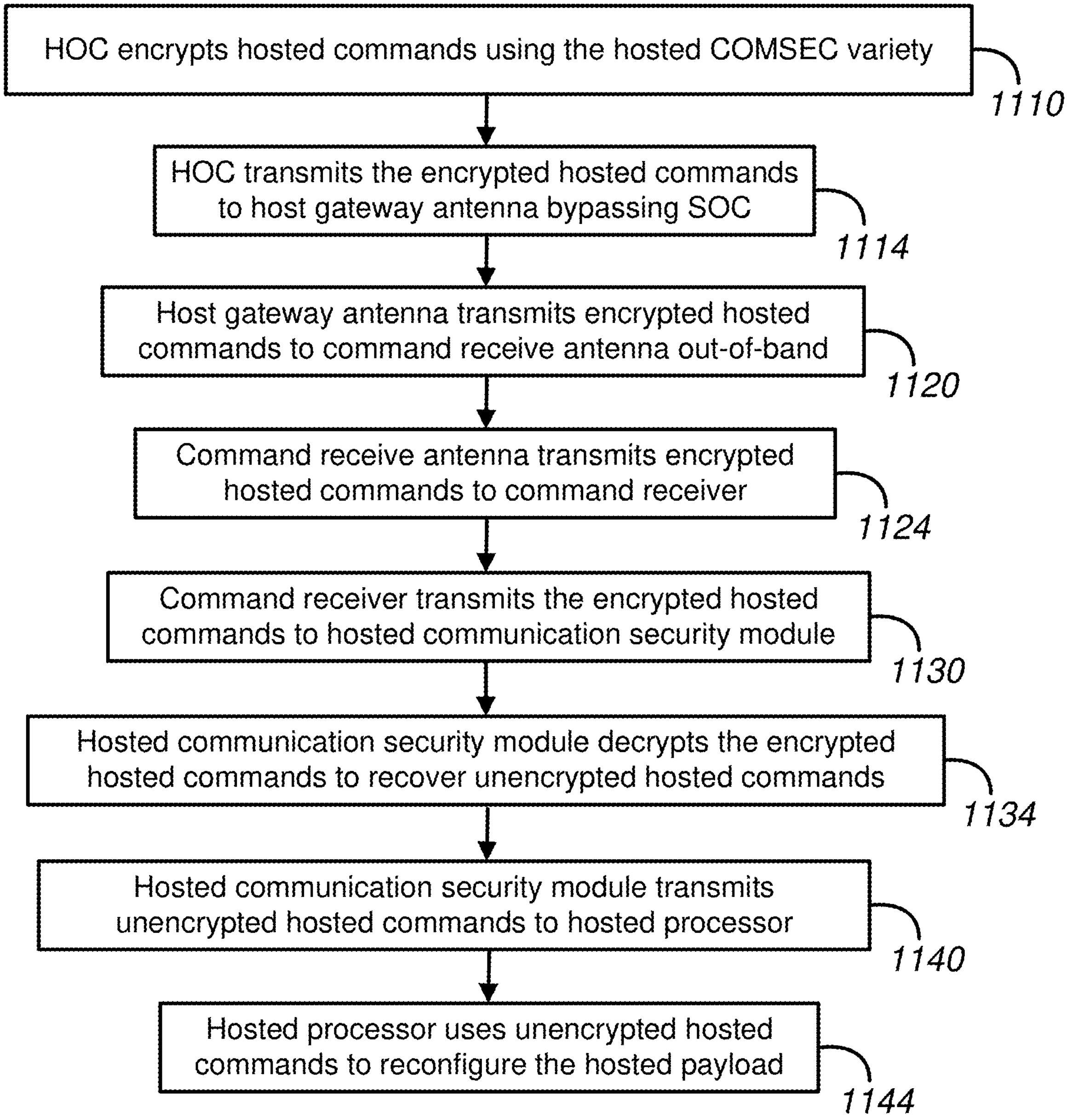

More particularly, in the example of FIG. 11, HOC 160 encrypts 1110 hosted commands using the hosted COMSEC variety, and transmits 1114 the encrypted hosted commands directly to the host gateway antenna 116, bypassing the SOC 150. The host gateway antenna 116 transmits 1120 the encrypted hosted commands to command receive antenna 121 out-of-band. Command receive antenna 121 transmits 1124 the encrypted hosted commands to the command receiver 135. The command receiver 135 transmits 1130 the encrypted hosted commands to hosted communication security module 165 for decryption 1134 using the hosted COMSEC variety. The hosted communication security module 165 transmits 1140 the unencrypted hosted commands back to hosted processor 183. The hosted processor 183 uses 1144 the unencrypted hosted commands to reconfigure the hosted payload 105 as described above.

Hosted TLM "Direct to Outband" (e.g. Scenarios 41, 43-44, 46-47, 49-50, 52, 69, 71, 73, 75, 85, 87, 89, 91, 93, 95, 97, 99, 101, 103, 105, 107). See FIG. 12.

This path is the reverse of Hosted CMD "direct to Outband" (e.g. Scenarios 41-42 and others as described above).

Figure 12:
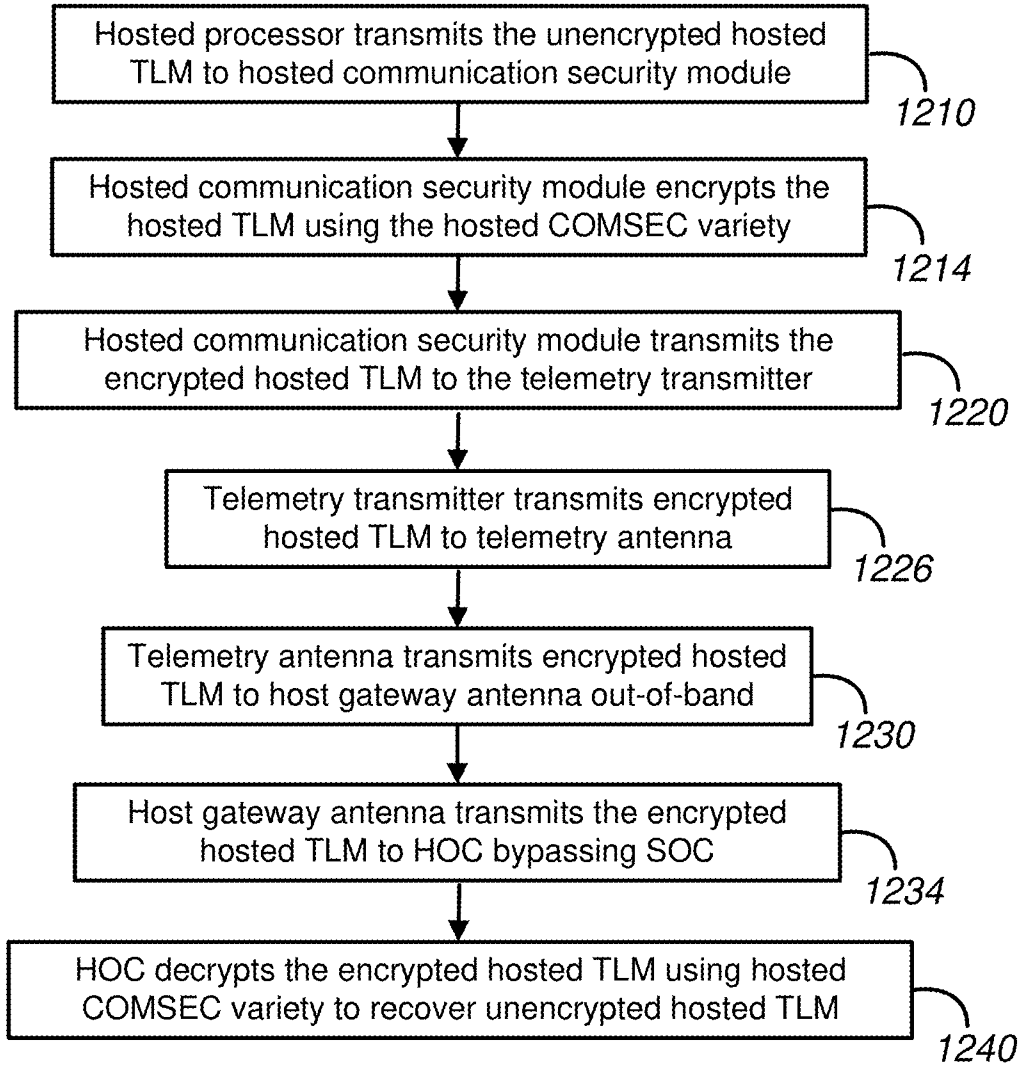

More particularly, in the example of FIG. 12, hosted processor 183 transmits 1210 the unencrypted hosted TLM to hosted communication security module 165 for encryption 1214 using the hosted COMSEC variety. Hosted communication security module 165 transmits 1220 the encrypted hosted TLM to telemetry transmitter 194. The telemetry transmitter 194 transmits 1226 the encrypted hosted TLM to the telemetry antenna 196. Telemetry antenna 196 transmits 1230 the encrypted hosted TLM to host gateway antenna 116 out-of-band. Host gateway antenna 116 transmits 1234 the encrypted hosted TLM directly to HOC 160 bypassing the SOC. HOC 160 decrypts 1240 the encrypted hosted TLM using the hosted COMSEC variety to recover the unencrypted hosted TLM.

Hosted CMD "Via HPC and Multi-Frequency Host Ground Antenna" (e.g. Scenarios 101, 103, 105, 107, 109-110. 112-113, 115-116, 118-119, 121, 123, 125, 127, 129, 131, 133, 135)

This path is the same as Hosted CMD "via HPC and Host Ground Antenna" (e.g. Scenarios 1-2 and others as described above), except that the host ground antenna 117 is a multi-frequency antenna that can transmit both in the host and hosted in-band frequency bands. See the description above for Hosted CMD "via Multi-Frequency Host Ground Antenna" (e.g. Scenarios 29-30, . . . ).

Hosted TLM "Via HPC and Multi-Frequency Host Ground Antenna" (e.g. Scenarios 102, 104, 106, 108, 109, 111-112, 114-115, 117-118, 120, 122, 124, 126, 128, 130, 132, 134, 136)

This path is the same as Hosted TLM "via HPC and Host Ground Antenna" (Scenarios 1, 3, 5, 7, and others as described above), except that the host ground antenna 117 is a multi-frequency antenna that can transmit both in the host and hosted in-band frequency bands. See the description above for Hosted CMD "via Multi-Frequency Host Ground Antenna" (e.g. Scenarios 29-30, . . . ).

Resource Sharing Between Host and Hosted Operations

In some embodiments, the host and hosted CMD/TLM operations are independent from each other. If however the hosted operations use a host resource, e.g. the host gateway antenna 116 or the host ground antenna 117 or a payload antenna 107, then some embodiments may coordinate the use of the shared resources via link 124 for example. For example, the host may use the out-of-band antenna—host gateway antenna 116—if the hosted operations use the host ground antenna 117. The coordination between the host and hosted operations can be achieved through communications between HOC 160 and SOC 150 via link 124 for example.

Although particular embodiments have been shown and described, it should be understood that the above discussion is not intended to limit the scope of these embodiments. For example, the invention is not limited by particular components or transmission paths within vehicle 110. The invention is not limited by particular antenna types as antennas 117, 107, 116, 196, etc.—the antennas may be RF antennas, lasercom antennas, or some other type. While embodiments and variations of the many aspects of the invention have been disclosed and described herein, such disclosure is provided for purposes of explanation and illustration only. Thus, various changes and modifications may be made without departing from the scope of the claims.

As used herein, the term "host payload frequency range" denotes a transmission band used for host user data. The term "hosted payload frequency range" denotes a transmission band used for hosted user data.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system comprising:

a hosted payload operations center (HOC) to control operations of a hosted payload on a vehicle, the HOC being to generate encrypted hosted commands in accordance with hosted user requests and to transmit the hosted commands to the vehicle via a hosted command (CMD) path;

wherein the vehicle further carries a host payload whose operations are controlled by a host payload operations center (HPC) configured to generate encrypted host commands in accordance with host user requests and to transmit the host commands to the vehicle via a host CMD path;

wherein the vehicle carries the hosted payload whose operations are controlled by the hosted payload operations center (HOC) configured to generate the encrypted hosted commands in accordance with the hosted user requests and to transmit the hosted commands to the vehicle via the hosted CMD path;

wherein the host payload is to generate encrypted host telemetry (TLM), and the hosted payload is to generate encrypted hosted TLM;

wherein the vehicle is to transmit the host TLM to the HPC via a host TLM path;

wherein the vehicle is to transmit the hosted TLM to the HOC via a hosted TLM path; and wherein the hosted CMD path is selected from:

a first hosted CMD path comprising the HPC, an in-band host ground antenna, the host payload, and the hosted payload; and a second hosted CMD path.

2. The system of claim 1, wherein the hosted CMD path is selected from:

the first hosted CMD path comprising the HPC, the in-band host ground antenna, the host payload, and the hosted payload; and the second hosted CMD path comprising an in-band hosted ground antenna and the hosted payload; and wherein the hosted commands are double encrypted in the first hosted CMD path.

3. The system of claim 1, wherein the hosted TLM path is selected from:

a first hosted TLM path comprising the hosted payload, the host payload, the in-band host ground antenna, and the HPC; and a second hosted TLM path comprising the hosted payload and an in-band hosted ground antenna; and wherein the hosted TLM is double encrypted in the first hosted TLM path.

4. The system of claim 1, wherein the host CMD path is selected from:

a first host CMD path comprising an out-of-band host gateway antenna; and a second host CMD path comprising the in-band host ground antenna.

5. The system of claim 1, wherein the host TLM path is selected from:

a first host TLM path comprising an out-of-band host gateway antenna; and a second host TLM path comprising the in-band host ground antenna.

6. The system of claim 1, wherein the hosted CMD path is selected from:

the first hosted CMD path comprising the HPC, the in-band host ground antenna, the host payload, and the hosted payload; and the second hosted CMD path comprising the in-band host ground antenna, the host payload, and the hosted payload; and wherein the hosted commands are double encrypted in the first hosted CMD path.

7. The system of claim 6, wherein the hosted TLM path is selected from:

a first hosted TLM path comprising the hosted payload, the host payload, the in-band host ground antenna, and the HPC; and a second hosted TLM path comprising the hosted payload and the in-band host ground antenna; and wherein the hosted TLM is double encrypted in the first hosted TLM path.

8. The system of claim 7, wherein the host CMD path is selected from:

a first host CMD path comprising an out-of-band host gateway antenna; and a second host CMD path comprising the in-band host ground antenna.

9. The system of claim 8, wherein the host TLM path is selected from:

a first host TLM path comprising an out-of-band host gateway antenna; and a second host TLM path comprising the in-band host ground antenna.

10. A system comprising:

a hosted payload operations center (HOC) to control operations of a hosted payload on a vehicle, the HOC being to generate encrypted hosted commands in accordance with hosted user requests and to transmit the hosted commands to the vehicle via a hosted command (CMD) path;

wherein the vehicle further carries a host payload whose operations are controlled by a host payload operations center (HPC) configured to generate encrypted host commands in accordance with host user requests and to transmit the host commands to the vehicle via a host CMD path;

wherein the vehicle carries the hosted payload whose operations are controlled by the hosted payload operations center (HOC) configured to generate the encrypted hosted commands in accordance with the hosted user requests and to transmit the hosted commands to the vehicle via the hosted CMD path;

wherein the host payload is to generate encrypted host telemetry (TLM), and the hosted payload is to generate encrypted hosted TLM;

wherein the vehicle is to transmit the host TLM to the HPC via a host TLM path;

wherein the vehicle is to transmit the hosted TLM to the HOC via a hosted TLM path;

wherein the hosted CMD path is selected from:

a first hosted CMD path comprising the HPC, a multi-frequency host ground antenna, the host payload, and the hosted payload; and a second hosted CMD path comprising the multi-frequency host ground antenna and the hosted payload;

wherein the multi-frequency host ground antenna is operable to communicate via a host payload frequency range and a hosted payload frequency range; and wherein the hosted commands are double encrypted in the first hosted CMD path.

11. The system of claim 10, wherein the hosted TLM path is selected from:

a first hosted TLM path comprising the hosted payload, the host payload, the multi-frequency host ground antenna, and the HPC; and a second hosted TLM path comprising the hosted payload and the multi-frequency host ground antenna; and wherein the hosted TLM is double encrypted in the first hosted TLM path.

12. The system of claim 10, wherein the host CMD path is selected from:

a first host CMD path comprising an out-of-band gateway antenna; and a second host CMD path comprising the multi-frequency host ground antenna.

13. The system of claim 10, wherein the host TLM path is selected from:

a first host TLM path comprising an out-of-band gateway antenna; and a second host TLM path comprising the multi-frequency host ground antenna.

14. The system of claim 1, wherein the hosted CMD path is selected from:

the first hosted CMD path comprising the HPC, the in-band host ground antenna, the host payload, and the hosted payload; and the second hosted CMD path comprising an out-of-band host gateway antenna and a command receiver on the vehicle; and wherein the hosted commands are double encrypted in the first hosted CMD path.

15. The system of claim 1, wherein the hosted TLM path is selected from:

a first hosted TLM path comprising the hosted payload, the host payload, the in-band host ground antenna, and the HPC; and a second hosted TLM path comprising a telemetry transmitter on the vehicle, a host satellite operation center (SOC), and an out-of-band host gateway antenna; and wherein the hosted TLM is double encrypted in the first hosted TLM path.

16. The system of claim 1, wherein the host CMD path is selected from:

a first host CMD path comprising an out-of-band host gateway antenna; and a second host CMD path comprising the in-band host ground antenna; and wherein the host TLM path is selected from:

a first host TLM path comprising the out-of-band host gateway antenna; and a second host TLM path comprising the in-band host ground antenna.

17. A method comprising:

generating encrypted hosted commands by a hosted payload operations center (HOC) in accordance with hosted user requests to control operations of a hosted payload on a vehicle;

transmitting the hosted commands to the vehicle via a hosted command (CMD) path;

generating encrypted host commands by a host payload operations center (HPC) in accordance with host user requests to control operations of a host payload on the vehicle;

transmitting the host commands to the vehicle via a host CMD path;

generating encrypted host telemetry (TLM) by the host payload;

generating encrypted hosted TLM by the hosted payload;

transmitting the host TLM to the HPC by the vehicle via a host TLM path;

transmitting the hosted TLM to the HOC by the vehicle via a hosted TLM path; and selecting the hosted CMD path from:

a first hosted CMD path comprising the HPC, an in-band multi-frequency host ground antenna, the host payload, and the hosted payload; and a second hosted CMD path.

18. The method of claim 17, wherein the second hosted CMD path comprises an in-band hosted ground antenna and the hosted payload; and the method further comprises double encrypting the hosted commands in the first hosted CMD path.

19. The method of claim 17, wherein;

the second hosted CMD path comprises a multi-frequency host ground antenna and the hosted payload; and the method further comprises double encrypting the hosted commands in the first hosted CMD path.

20. The method of claim 17, wherein the second hosted CMD path comprises an out-of-band host gateway antenna and a command receiver on the vehicle; and the method further comprises double encrypting the hosted commands in the first hosted CMD path.

* * * * *